US008423003B2

(12) United States Patent
Sarukkai et al.

(10) Patent No.: US 8,423,003 B2
(45) Date of Patent: Apr. 16, 2013

(54) SYSTEM FOR SERVING TARGETED ADVERTISEMENTS OVER MOBILE MESSAGING SERVICES

(75) Inventors: Ramesh R. Sarukkai, Union City, CA (US); Subash Sundaresan, Fremont, CA (US); P. Sam Hamilton, Los Altos, CA (US); Shubhasheesh Anand, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1121 days.

(21) Appl. No.: 11/776,073

(22) Filed: Jul. 11, 2007

(65) Prior Publication Data

US 2009/0017804 A1    Jan. 15, 2009

(51) Int. Cl.
*H04L 29/06*    (2006.01)

(52) U.S. Cl.
USPC ............... 455/414.3; 455/466; 455/414.1; 705/14.69; 705/14.66; 705/14.36; 705/40; 705/26

(58) Field of Classification Search .......... 705/14.1
See application file for complete search history.

(56) References Cited

U.S. PATENT DOCUMENTS

| | | | |
|---|---|---|---|
| 6,009,409 A | 12/1999 | Adler et al. ............ | 705/14 |
| 6,026,368 A | 2/2000 | Brown et al. ............ | 705/14 |
| 6,047,310 A | 4/2000 | Kamakura et al. | |
| 6,199,045 B1 | 3/2001 | Giniger et al. ............ | 705/1 |
| 6,205,193 B1 * | 3/2001 | Solve et al. ............ | 375/354 |
| 6,298,330 B1 | 10/2001 | Gardenswartz et al. | |
| 6,334,108 B1 | 12/2001 | Deaton et al. | |
| 6,343,317 B1 | 1/2002 | Glorikian ............ | 709/217 |
| 6,377,793 B1 | 4/2002 | Jenkins ............ | 455/456 |

(Continued)

FOREIGN PATENT DOCUMENTS

| | | | |
|---|---|---|---|
| JP | 1996-172495 A | 7/1996 | |
| JP | 8172495 A | 7/1996 | |

(Continued)

OTHER PUBLICATIONS

"CTIA: Smaato Introduces New Mobile Ad Solutions for Carriers: Advertising Delivery Support for Java Phones, Smartphones & Mobile Web; Launch of New Version of SOMA Mobile Advertising Platform," CTIA—San Francisco Moscone Center, Booth # 108, Oct. 23-25, 2007, 2 pages. Retrieved from http://www.smaato.com/download/pressarea/Smaato_CTIA_20071022_release.pdf.

(Continued)

*Primary Examiner* — Kwasi Karikari
(74) *Attorney, Agent, or Firm* — Brinks Hofer Gilson & Lione

(57) ABSTRACT

A system is described for serving targeted advertisements over mobile messaging services. The system may include a processor, a memory and an interface. The memory may store a request for an advertisement and an advertisement. The interface may be operatively connected to the memory and the processor and may communicate with mobile network operators. The mobile network operators may be capable of providing mobile services users. The processor may be operatively connected to the interface and the memory and may receive a request for an advertisement from a mobile network operator via the interface. The request for an advertisement may be related to a mobile message sent from a first user to a second user via the mobile network operator. The processor may retrieve an advertisement based on the request for an advertisement. The processor may communicate the advertisement to the mobile network operator via the interface.

9 Claims, 11 Drawing Sheets

U.S. PATENT DOCUMENTS

| | | | |
|---|---|---|---|
| 6,381,465 B1 | 4/2002 | Chern et al. | |
| 6,401,075 B1 | 6/2002 | Mason et al. | 705/14 |
| 6,480,713 B2 | 11/2002 | Jenkins | 455/456 |
| 6,510,515 B1 | 1/2003 | Raith | |
| 6,654,725 B1 | 11/2003 | Langheinrich et al. | 705/14 |
| 6,681,107 B2 | 1/2004 | Jenkins et al. | 455/412.1 |
| 6,714,975 B1 | 3/2004 | Aggarwal et al. | 709/224 |
| 6,795,710 B1 | 9/2004 | Creemer | |
| 6,822,663 B2 | 11/2004 | Wang et al. | |
| 6,826,572 B2 | 11/2004 | Colace et al. | 707/10 |
| 6,907,566 B1 | 6/2005 | McElfresh et al. | 715/517 |
| 6,928,615 B1 | 8/2005 | Haitsuka et al. | 345/340 |
| 6,985,742 B1 | 1/2006 | Giniger et al. | 455/414.3 |
| 7,043,483 B2 | 5/2006 | Colace et al. | 707/3 |
| 7,120,235 B2 | 10/2006 | Altberg et al. | |
| 7,136,661 B2 | 11/2006 | Graske et al. | |
| 7,200,853 B2 | 4/2007 | Kawai | |
| 7,277,718 B2 | 10/2007 | Wong | |
| 7,283,974 B2 | 10/2007 | Katz et al. | |
| 7,363,024 B2 | 4/2008 | Jenkins | 455/412.1 |
| 7,487,112 B2 | 2/2009 | Barnes, Jr. | |
| 7,593,721 B2 | 9/2009 | Ratnakar | |
| 7,606,918 B2 | 10/2009 | Holzman et al. | |
| 7,657,520 B2 | 2/2010 | Chen et al. | |
| 7,660,581 B2 | 2/2010 | Ramer et al. | |
| 7,729,945 B1 | 6/2010 | Katz et al. | |
| 7,801,892 B2 | 9/2010 | Lee et al. | |
| 2002/0010759 A1 | 1/2002 | Hitson et al. | |
| 2002/0046259 A1 | 4/2002 | Glorikian | 709/203 |
| 2002/0073034 A1 | 6/2002 | Wagner et al. | 705/51 |
| 2002/0077897 A1 | 6/2002 | Zellner et al. | |
| 2002/0078101 A1 | 6/2002 | Chang et al. | 707/516 |
| 2002/0083441 A1 | 6/2002 | Flickinger et al. | |
| 2002/0083442 A1 | 6/2002 | Eldering | |
| 2002/0128908 A1 | 9/2002 | Levin et al. | |
| 2002/0129137 A1 | 9/2002 | Mills et al. | |
| 2002/0161791 A1 | 10/2002 | Hanhikoski | |
| 2002/0164004 A1 | 11/2002 | Tamura et al. | |
| 2003/0046161 A1 | 3/2003 | Kamangar et al. | 705/14 |
| 2003/0055725 A1 | 3/2003 | Lee | |
| 2003/0149938 A1 | 8/2003 | McElfresh et al. | 715/517 |
| 2003/0154446 A1* | 8/2003 | Constant et al. | 715/531 |
| 2004/0039733 A1 | 2/2004 | Soulanille | 707/3 |
| 2004/0044571 A1 | 3/2004 | Bronnimann et al. | |
| 2004/0054576 A1* | 3/2004 | Kanerva et al. | 705/14 |
| 2004/0088212 A1 | 5/2004 | Hill | |
| 2004/0093327 A1* | 5/2004 | Anderson et al. | 707/3 |
| 2004/0186776 A1 | 9/2004 | Llach | 709/200 |
| 2004/0194130 A1 | 9/2004 | Konig et al. | |
| 2005/0010477 A1 | 1/2005 | Sullivan et al. | 705/10 |
| 2005/0154746 A1 | 7/2005 | Liu et al. | 707/5 |
| 2005/0174975 A1 | 8/2005 | Mgrdechian et al. | 370/338 |
| 2005/0228797 A1 | 10/2005 | Koningstein et al. | |
| 2005/0289113 A1 | 12/2005 | Bookstaff | |
| 2006/0026069 A1 | 2/2006 | Mazurkiewicz et al. | |
| 2006/0041638 A1 | 2/2006 | Whittaker et al. | |
| 2006/0085419 A1 | 4/2006 | Rosen | 705/1 |
| 2006/0100928 A1* | 5/2006 | Walczak et al. | 705/14 |
| 2006/0116926 A1 | 6/2006 | Chen | |
| 2006/0149630 A1 | 7/2006 | Elliott et al. | 705/14 |
| 2006/0172697 A1 | 8/2006 | Gallego et al. | 455/522 |
| 2006/0184512 A1 | 8/2006 | Kohanim et al. | |
| 2006/0194572 A1 | 8/2006 | Fresonke et al. | 455/414.1 |
| 2006/0194595 A1 | 8/2006 | Myllynen et al. | 455/412.2 |
| 2006/0242013 A1 | 10/2006 | Agarwal et al. | |
| 2006/0271524 A1 | 11/2006 | Tanne et al. | |
| 2006/0282408 A1 | 12/2006 | Wisely et al. | |
| 2006/0288000 A1 | 12/2006 | Gupta | |
| 2007/0018952 A1 | 1/2007 | Arseneau et al. | |
| 2007/0027852 A1 | 2/2007 | Howard et al. | |
| 2007/0042754 A1* | 2/2007 | Bajikar et al. | 455/411 |
| 2007/0061334 A1 | 3/2007 | Ramer et al. | |
| 2007/0088801 A1* | 4/2007 | Levkovitz et al. | 709/217 |
| 2007/0112739 A1 | 5/2007 | Burns et al. | |
| 2007/0121846 A1 | 5/2007 | Altberg et al. | |
| 2007/0174258 A1 | 7/2007 | Jones et al. | |
| 2007/0174490 A1 | 7/2007 | Choi et al. | 709/246 |
| 2007/0192318 A1 | 8/2007 | Ramer et al. | |
| 2007/0198339 A1* | 8/2007 | Shen et al. | 705/14 |
| 2007/0213069 A1 | 9/2007 | Ji et al. | |
| 2007/0214043 A1 | 9/2007 | Yasuda | |
| 2007/0214048 A1 | 9/2007 | Chan et al. | |
| 2007/0233565 A1 | 10/2007 | Herzog et al. | |
| 2007/0233566 A1 | 10/2007 | Zlotin et al. | |
| 2007/0264987 A1 | 11/2007 | Gupta et al. | |
| 2007/0288318 A1 | 12/2007 | Gupta et al. | |
| 2007/0294725 A1 | 12/2007 | Cohen et al. | |
| 2008/0032703 A1* | 2/2008 | Krumm et al. | 455/456.1 |
| 2008/0221983 A1 | 9/2008 | Ausiannik et al. | |
| 2008/0256050 A1* | 10/2008 | Zhang et al. | 707/5 |
| 2009/0049090 A1 | 2/2009 | Shenfield et al. | |

FOREIGN PATENT DOCUMENTS

| | | |
|---|---|---|
| JP | 2008-558303 | 12/2000 |
| JP | 2004-038367 A | 2/2004 |
| JP | 2005-251021 | 9/2005 |
| JP | 2005-300806 | 10/2005 |
| JP | 2008-558303 | 2/2006 |
| KR | 10-2000-0036964 A | 7/2000 |
| KR | 10-2001-0090958 | 10/2001 |
| KR | 10-2001-0097071 A | 11/2001 |
| KR | 10-2001-0102668 A | 11/2001 |
| KR | 10-2002-0000289 A | 1/2002 |
| KR | 10-2002-0065806 A | 8/2002 |
| KR | 2003-0026446 A | 4/2003 |
| KR | 10-2004-0099223 A | 11/2004 |
| KR | 10-2005-0097155 A | 10/2005 |
| KR | 2006-0004579 A | 1/2006 |
| KR | 2006-0028515 A | 3/2006 |
| KR | 2006-0062360 A | 6/2006 |
| KR | 10-2006-0127318 A | 12/2006 |
| KR | 10-0757757 B1 | 9/2007 |

OTHER PUBLICATIONS

"Strong Partners for Effective Mobile Advertising: Adconion Media Group and Smaato Enter Strategic Partnership," San Mateo / Munich, Germany—May 9, 2007, 2 pages. Retrieved from http://www.smaato.com/download/pressarea/Smaato_AMD_20070503_release.pdf.

"Smaato—Media / Developers," pp. 1-2, http://www.smaato.com/mo_mediadev.php, available at least as of Jan. 3, 2008.

"Smaato—Mobile Carriers," pp. 1-2, http://www.smaato.com/mo_carriers.php, available as least as of Jan. 3, 2008.

"Smaato—Mobile Marketing," pp. 1-2, http://www.smaato.com/mobile.php, available at least as of Jan. 3, 2008.

"My First 6 Yahoo Panama 'Enhancement' Requests [Archive]", *Search Engine Watch Forums*, pp. 1-2, http://forums.searchenginewatch.com/archive/index.php/t-15882.html, containing posts from Jan. 18, 2007 to Jan. 25, 2007, last visited Apr. 23, 2008.

"Limbo Offers Purina Pet Lodown,"*Adweek*, pp. 1-2, http://www.adweek.com/aw/iq_interactive/article_display.jsp?vnu_content_id=1003665626, dated Oct. 31, 2007, last visited Apr. 1, 2008.

"ESME", *Wikipedia, the free encyclopedia*, p. 1, http://en.wikipedia.org/wiki/ESME, last visited Oct. 9, 2007.

"Network Switching Subsystem", *Wikipedia, the free encyclopedia*, pp. 1-6, http://en.wikipedia.org/wiki/Network_Switching_Subsystem, last visited Oct. 9, 2007.

"Short message service", *Wikipedia, the free encyclopedia*, pp. 1-5, http://en.wikipedia.org/wiki/Short_message_service, last visited Oct. 9, 2007.

"Short message service center", *Wikipedia, the free encyclopedia*, pp. 1-2, http://en.wikipedia.org/wiki/Short_message_service_center, last visited Oct. 9, 2007.

"Signal Transfer Point", *Wikipedia, the free encyclopedia*, p. 1, http://en.wikipedia.org/wiki/Signal_transfer_point, last visited Oct. 9, 2007.

Advisory Action mailed Feb. 14, 2011 for U.S. Appl. No. 11/963,154, 3 pages.

Examiner's Answer to Appeal Brief mailed Jan. 18, 2011 for U.S. Appl. No. 11/712,276, 16 pages.

International Preliminary Report on Patentability dated Feb. 1, 2011 for corresponding International Application No. PCT/US2009/049227, 7 pages.
Office Action mailed Jan. 21, 2011 for U.S. Appl. No. 12/180,782, 11 pages.
Office Action mailed Feb. 16, 2011 for U.S. Appl. No. 12/059,421, 12 pages.
Final Office Action mailed Feb. 2, 2011 for U.S. Appl. No. 11/830,230, 18 pages.
Final Office Action mailed Feb. 3, 2011 for U.S. Appl. No. 11/963,029, 13 pages.
Final Office Action mailed Feb. 16, 2011 for U.S. Appl. No. 11/830,307, 17 pages.
Final Office Action mailed Feb. 17, 2011 for U.S. Appl. No. 12/026,522, 23 pages.
Final Office Action mailed Apr. 13, 2011 for U.S. Appl. No. 11/963,082, 13 pages.
Advisory Action mailed Apr. 16, 2010 for U.S. Appl. No. 11/830,431, 3 pages.
Advisory Action mailed Aug. 10, 2010 for U.S. Appl. No. 11/776,081, 3 pages.
Advisory Action mailed Aug. 3, 2010 for U.S. Appl. No. 11/712,276, 3 pages.
Advisory Action mailed May 27, 2010 for U.S. Appl. No. 11/830,406, 3 pages.
Advisory Action mailed May 3, 2010 for U.S. Appl. No. 11/830,344, 3 pages.
Examiner's Answer to Appeal Brief mailed Aug. 30, 2010 for U.S. Appl. No. 11/830,344, 16 pages.
Examiner's Answer to Appeal Brief mailed Aug. 4, 2010 for U.S. Appl. No. 11/830,431, 11 pages.
Examiner's Answer to Appeal Brief mailed Oct. 21, 2010 for U.S. Appl. No. 11/830,406, 22 pp.
Final Office Action mailed Apr. 29, 2010 for U.S. Appl. No. 11/776,081, 13 pages.
Final Office Action mailed Feb. 12, 2010 for U.S. Appl. No. 11/830,431, 11 pages.
Final Office Action mailed Feb. 24, 2010 for U.S. Appl. No. 11/830,344, 15 pages.
Final Office Action mailed Mar. 23, 2010 for U.S. Appl. No. 11/830,406, 14 pages.
Final Office Action mailed Mar. 5, 2010 for U.S. Appl. No. 11/712,276, 13 pages.
Final Office Action mailed Nov. 23, 2010 for U.S. Appl. No. 11/963,154, 19 pages.
Final Office Action mailed Sep. 7, 2010 for U.S. Appl. No. 12/165,175, 18 pages.
International Preliminary Report on Patentability dated Aug. 10, 2010 for corresponding International Application No. PCT/US2009/030196, 6 pages.
International Preliminary Report on Patentability dated Jan. 12, 2010 for corresponding International Application No. PCT/US2008/067099, 6 pages.
International Preliminary Report on Patentability dated Jun. 22, 2010 for corresponding International Application No. PCT/US2008/084163, 6 pages.
International Preliminary Report on Patentability dated Jun. 22, 2010 for corresponding International Application No. PCT/US2008/084172, 6 pages.
International Preliminary Report on Patentability dated Jun. 22, 2010 for corresponding International Application No. PCT/US2008/084338, 7 pages.
International Preliminary Report on Patentability dated Oct. 5, 2010 for corresponding International Application No. PCT/US2009/035657, 6 pages.
International Preliminary Report on Patentability dated Oct. 5, 2010 for corresponding International Application No. PCT/US2009/035662, 8 pages.
International Preliminary Report on Patentability dated Sep. 9, 2008 for corresponding International Application No. PCT/US2007/005217, 6 pages.
International Search Report and Written Opinion of the International Searching Authority dated Aug. 16, 2007 for corresponding International Application No. PCT/US2007/005217, 9 pages.
International Search Report and Written Opinion of the International Searching Authority dated Aug. 31, 2009 for corresponding International Application No. PCT/US2009/035662, 9 pages.
International Search Report and Written Opinion of the International Searching Authority dated Feb. 12, 2010 for corresponding International Application No. PCT/US2009/049227, 12 pages.
International Search Report and Written Opinion of the International Searching Authority dated Feb. 18, 2009 for corresponding International Application No. PCT/US2008/067099, 7 pages.
International Search Report and Written Opinion of the International Searching Authority dated Jul. 27, 2009 for corresponding International Application No. PCT/US2009/030196, 7 pages.
International Search Report and Written Opinion of the International Searching Authority dated Jul. 31, 2009 for corresponding International Application No. PCT/US2009/035657, 7 pages.
International Search Report and Written Opinion of the International Searching Authority dated Jun. 24, 2009 for corresponding International Application No. PCT/US2008/084172, 7 pages.
International Search Report and Written Opinion of the International Searching Authority dated Jun. 24, 2009 for corresponding International Application No. PCT/US2008/084338, 8 pages.
International Search Report and Written Opinion of the International Searching Authority dated Jun. 30, 2009 for corresponding International Application No. PCT/US2008/084163, 7 pages.
"Internet White Paper 2006," Internet White Paper, R&D, Tokyo, Japan, Jun. 21 2006, 15 pages.
Japanese Blog, printed from the internet at <http://halhal777.blog3.fc2.com/blog-entry-94.html> on Apr. 24, 2009, 12 pages.
Japanese Blog, printed from the internet at <http://k.hatena.ne.jp/keywordblog/jmobi> on Apr. 24, 2009, 3 pages.
Japanese Blog, printed from the internet at <http://blog.livedoor.jp/junpaku/archives/16328274.html on Apr. 24> 2009, 4 pages.
Japanese Blog, printed from the Internet at <http://netanetaneta.seesaa.net/> on Apr. 24, 2009, 10 pages.
Japanese Blog, printed from the internet at <http://www.rc-seo.jp/000027.html> on Apr. 24, 2009, 2 pages.
Japanese Blog, printed from the internet at <http://www.cottonwool.jp/labo/jmobi.html> on Apr. 24, 2009, 3 pages.
Japanese Blog, printed from the internet at <http://www.googleadsense.seesaa.net/article/2238902.html> on Apr. 24, 2009, 3 pages.
Japanese Blog, printed from the internet at <http://vanillachips.net/archives/20050309_2336.php> on Apr. 24, 2009, 4 pages.
Notice of Allowance mailed Feb. 17, 2010 for U.S. Appl. No. 11/830,194, 12 pages.
Notice of Allowance mailed Oct. 21, 2010 for U.S. Appl. No. 11/830,194, 9 pages.
Office Action dated Jul. 28, 2010 for corresponding Korean Application No. 10-2008-7021632, 11 pages.
Office Action mailed Aug. 20, 2010 for U.S. Appl. No. 12/026,522, 18 pages.
Office Action mailed Dec. 10, 2010 for U.S. Appl. No. 11/963,082, 13 pages.
Office Action mailed Dec. 20, 2010 for U.S. Appl. No. 12/059,460, 10 pages.
Office Action mailed Dec. 22, 2009 for U.S. Appl. No. 11/776,081, 9 pages.
Office Action mailed Jun. 10, 2010 for U.S. Appl. No. 11/963,154, 11 pages.
Office Action mailed May 4, 2010 for U.S. Appl. No. 12/165,175, 21 pages.
Office Action mailed Nov. 3, 2010 for U.S. Appl. No. 11/830,307, 17 pages.
Office Action mailed Oct. 20, 2010 for U.S. Appl. No. 11/963,029, 14 pages.
Office Action mailed Oct. 21, 2010 for U.S. Appl. No. 11/830,230, 19 pages.
Office Action mailed Sep. 10, 2009 for U.S. Appl. No. 11/712,276, 12 pages.

Office Action mailed Sep. 11, 2009 for U.S. Appl. No. 11/830,344, 15 pages.
Office Action mailed Sep. 14, 2009 for U.S. Appl. No. 11/830,406, 15 pages.
Office Action mailed Sep. 4, 2009 for U.S. Appl. No. 11/830,194, 14 pages.
Office Action mailed Sep. 9, 2009 for U.S. Appl. No. 11/830,431, 11 pages.
STIC Search Report EIC 3600 dated Feb. 5, 2010; cited by Examiner on Feb. 17, 2010 for U.S. Appl. No. 11/830,194, 86 pages.
Supplemental Final Office Action mailed Apr. 30, 2010 for U.S. Appl. No. 11/712,276, 15 pages.
"Mobile Search Engines White Paper," Sonera MediaLab, 2002, 13 pages.
European Search Report dated Aug. 10, 2011 for corresponding European Application No. 7751948.6, 6 pages.
Final Office Action dated Jun. 21, 2011 for U.S. Appl. No. 12/059,421, 12 pages.
Final Office Action dated Jul. 6, 2011 for U.S. Appl. No. 12/180,782, 14 pages.
Final Office Action dated Jul. 15, 2011 for U.S. Appl. No. 12/059,460, 13 pages.
Final Office Action dated Nov. 3, 2011 for U.S. Appl. No. 12/059,386, 14 pages.
Final Office Action dated Nov. 23, 2011 for U.S. Appl. No. 12/059,325, 11 pages.
Office Action dated Jun. 28, 2011 for U.S. Appl. No. 12/059,386, 23 pages.
Office Action dated Aug. 15, 2011 for U.S. Appl. No. 12/059,325, 21 pages.
Office Action dated Sep. 23, 2011 for U.S. Appl. No. 11/963,154, 22 pages.
Office Action dated Sep. 28, 2011 for U.S. Appl. No. 12/975,041, 16 pages.
Office Action dated Dec. 29, 2011 for U.S. Appl. No. 11/830,230, 15 pages.
Office Action dated May 17, 2011 for corresponding Australian Application No. 2009232311.0, 3 pages.
Office Action dated Jan. 10, 2011 for corresponding Chinese Application No. 200780008231.5, 10 pages.
Office Action dated Jul. 13, 2011 for corresponding Chinese Application No. 200980103451.5, 11 pages.
Office Action dated Aug. 8, 2011 for corresponding Chinese Application No. 200880122228.0, 12 pages.
Office Action dated Oct. 3, 2011 for corresponding Japanese Application No. 2008-558303, 8 pages.
Office Action dated Aug. 30, 2011 for corresponding Korean Application No. 10-2010-7016222, 7 pages.
Office Action dated Sep. 16, 2011 for corresponding Korean Application No. 10-2010-7017411, 5 pages.

* cited by examiner

SYSTEM FOR SERVING TARGETED ADVERTISEMENTS OVER MOBILE MESSAGING SERVICES

TECHNICAL FIELD

The present description relates generally to a system and method, generally referred to as a system, for serving targeted advertisements over mobile messaging services, and more particularly, but not exclusively, to serving targeted advertisements over short messaging services ("SMS").

BACKGROUND

The mobile phone may be increasingly important as an information and content access device. Currently there may be twice as many mobile communication devices as personal computers. Mobile operators may be increasingly looking to high value data services as a way to overcome the continuing voice average revenue per user decline. Billions of dollars may be being spent globally on wireless licenses with billions more in investments in the pipeline for development of infrastructure and services by wireless service and content providers. Carriers may be introducing new data, content and multimedia services as a means of generating new revenue stream, reversing negative ARPU trends, retaining and attracting customers as well as increasing returns on investment, and extending and differentiating their service offering to consumers. The emergence of these wireless technologies may be creating unique opportunities for wireless carriers, advertisers and publishers to generate additional revenue streams through new and existing customers. As consumer adoption of wireless technology continues to increase, marketing via mobile devices may become an important part of all integrated data communications strategies.

Mobile messaging services may be developing rapidly throughout the world. In 2001, there may have been billions of mobile messages sent, and that number may have doubled. Mobile messaging services may be widely used for delivering digital content, such as news alerts, financial information, ring tones, etc. Mobile messaging may also be used to send messages from one mobile user to another mobile user. There may not currently be an advertising solution to reach users of mobile messaging.

SUMMARY

A system is disclosed for serving targeted advertisements over mobile messaging services. The system may include a processor, a memory and an interface. The memory may be operatively connected to the processor and the interface and may store a request for an advertisement and an advertisement. The interface may be operatively connected to the memory and the processor and may communicate with mobile network operators. The mobile network operators may be capable of providing mobile services to a set of users. The processor may be operatively connected to the interface and the memory and may receive a request for an advertisement from a mobile network operator via the interface. The request for an advertisement may be related to a mobile message sent from a first user to a second user via the mobile network operator. The processor may retrieve an advertisement based on the request for an advertisement. The processor may communicate the advertisement to the mobile network operator via the interface.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

A system and method, generally referred to as a system, relate to serving targeted advertisements over mobile messaging, and more particularly, but not exclusively, to serving targeted advertisements over SMS messaging. The principles described herein may be embodied in many different forms.

Figure 1:
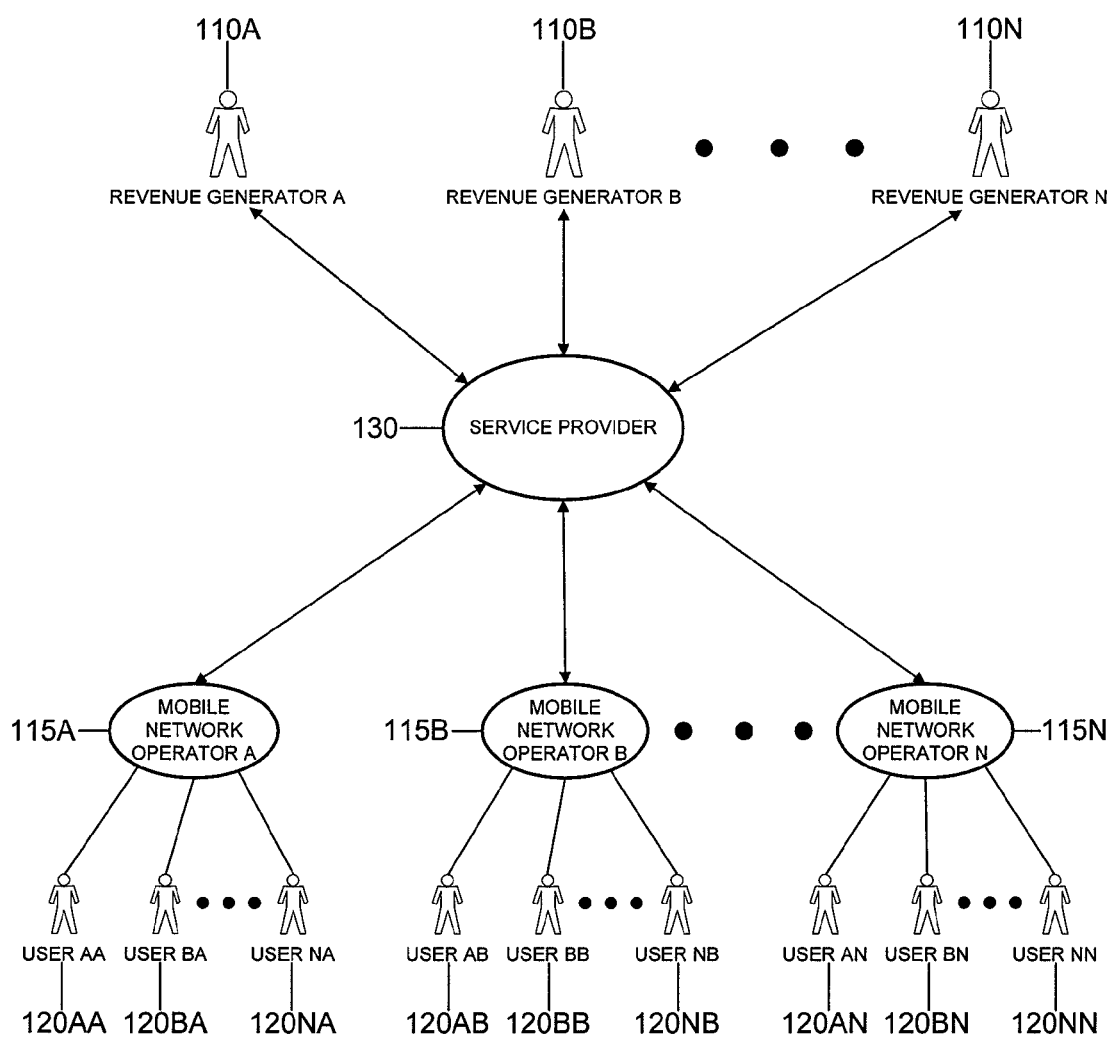
FIG. 1 is a block diagram of a general overview of a system for serving targeted advertisements over mobile messaging services.

FIG. 1 provides a general overview of a system 100 for serving targeted advertisements over mobile messaging services. Not all of the depicted components may be required, however, and some implementations may include additional components. Variations in the arrangement and type of the components may be made without departing from the spirit or scope of the claims as set forth herein. Additional, different or fewer components may be provided.

The system 100 may include one or more revenue generators 110A-N, such as mobile advertisers, a service provider 130, such as a portal, one or more mobile network operators ("MNOs") 115A-N, more commonly referred to as mobile carriers, or simply carriers, and one or more users 120AA-NN, such as mobile subscribers or consumers. The service provider 130 may implement an advertising campaign management system incorporating an auction based and/or non-auction based advertisement serving system.

The revenue generators 110A-N may pay the service provider 130 to serve, or display, advertisements of their goods or services, such as on-line advertisements, to the users 120AA-NN, such as over mobile messaging, mobile web, the Internet, or generally any venue for displaying advertisements. The advertisements may include sponsored listings, banners ads, popup advertisements, or generally any way of attracting the users 120AA-NN to the web site or mobile site of the revenue generators 110A-N. The users 120AA-NN may utilize the services of the service provider 130 through web applications, mobile applications or standalone applications.

The service provider 130 may maintain a mobile portal and/or a web portal, such as a search site, where the service provider 130 may display advertisements of the revenue generators 110A-N to the users 120AA-NN. In the case of a mobile portal, the service provider 130 may share revenue with the mobile network operators MNOs 115A-N of the users 120AA-NN for displaying advertisements of the revenue generators 110A-N via their mobile networks, on mobile applications running on their mobile networks or as a part of a mobile message sent through their mobile network. Alternatively or in addition the service provider 130 may share revenue with individual publishers for displaying advertisements of the revenue generators 110A-N on their mobile and/or web sites. The service provider 130 may supply and API to the MNOs 115A-N enabling the MNOs 115A-N to request advertisements from the service provider 130.

The MNOs 115A-N may provide a mobile network to the users 120AA-NN which may provide a variety of services to the users 120AA-NN, such as the ability to send and receive phone calls, send and receive mobile messages, to access the internet and/or the mobile web, or generally any service that may be implemented on a mobile device. The MNOs 115A-N may store data describing the users 120AA-NN, such as billing addresses, call histories, messaging histories, or generally any data regarding the users 120AA-NN that may be available to the MNOs 115A-N.

The service provider 130 may also provide a mobile alert service. The mobile alert service may allow the users 120AA-NN to receive information on their mobile devices over mobile messaging, such as news, stock prices, cricket scores, or generally any information the users 120AA-NN may wish to receive on their mobile device. The service provider 130 may include advertisements of the revenue generators 110A-N within the mobile alerts. The service provider 130 may also communicate advertisements to the MNOs 115A-N to display with mobile messages routed through their mobile networks or within mobile applications running on mobile devices on their mobile networks.

The amount the revenue generators 110A-N may pay the service provider 130 may be based on one or more factors. These factors may include impressions, click throughs, conversions, and/or generally any metric relating to the advertisement and/or the behavior of the users 120AA-NN. The impressions may refer to the number of times an advertisement may have been displayed to the users 120AA-NN. The click throughs may refer to the number of times the users 120AA-NN may have clicked through an advertisement to a web site, mobile web site or mobile landing page of one of the revenue generators 110A-N, such as the revenue generator A 110A. The conversions may refer to the number of times a desired action was taken by the users 120AA-NN after clicking though to a web site of the revenue generator A 110A. The desired actions may include submitting a sales lead, making a purchase, viewing a key page of the site, downloading a whitepaper, and/or any other measurable action. If the desired action is making a purchase, then the revenue generator A 110A may pay the service provider 130 a percentage of the purchase.

The users 120AA-NN may be mobile users who may engage in mobile messaging with one another, such as through a short message service ("SMS"), a multimedia messaging service ("MMS"), enhanced messaging service ("EMS"), J-PHONE's Skymail, NTT DOCOMO'S Short Mail, or generally any service for sending messages to/from mobile devices. The mobile messages may be routed through the MNOs 115A-N. The MNOs 115A-N may request advertisements from the service provider 130 to attach to the mobile messages of the users 120AA-NN. For example, the user AA 120AA may wish to send a mobile message to the user AB 120AB. The message may first be routed from the user AA 120AA to the MNO A 115A. The MNO A 115A may then forward the message to the MNO B 115B. The MNO B 115B may receive the message, and then, before forwarding the message to the user AB 120AB, the MNO B 115B may request a targeted advertisement of one of the revenue generators 110A-N from the service provider 130. The targeted advertisement may be attached to the message, and the message may then be sent to the user AB 120AB. The service provider 130 may share revenue with the MNOs 115A-N for attaching advertisements of the revenue generators 110A-N to messages routed through their mobile networks.

The users 120AA-NN may also be consumers of goods or services who may be searching for a business, such as the business of one of the revenue generators 110A-N. Alternatively or in addition the users 120AA-NN may be machines or other servers, such as the third party server 250. The users 120AA-NN may need a user identifier or identification ("user ID") to access the services of the service provider 130. In order to obtain a user ID the users 120AA-NN may need to supply information describing themselves to the service provider 130, such as the location, gender, or age of the users 120AA-NN, or generally any information that may be required for the users 120AA-NN to utilize the services provided by the service provider 130. The service provider 130 may collect user behavior data from the users 120AA-NN when they are logged in, such as queries searched for by the users 120AA-NN, links clicked on by the users 120AA-NN and/or any user interactions with the services provided by the service provider 130. The service provider 130 may also use cookies, such as a browser cookie, to collect user behavior data of users 120AA-NN who are not logged in or who are not otherwise identifiable.

The service provider 130 may serve advertisements to the users 120AA-NN, via mobile messages, relevant to the collected user behavior data. For example, if a user AA 120AA performed searches for sports topics, subscribed for sports alerts, or viewed sports related media or articles, the service provider server 130 may serve a sports related ad to the user AA 120AA with the alert. The revenue generators 110A-N may identify categories to associate their advertisements with, such as sports. Alternatively or in addition, the service provider server 130 may perform content matching on the advertisements of the revenue generators 110A-N and identified interests of the user AA 120AA, such as sports.

In the system 100, the revenue generators 110A-N may interact with the service provider 130, such as via a web application. The revenue generators 110A-N may send information, such as billing, website or mobile site and advertisement information, to the service provider 130 via the web application. The web application may include a web browser or other application such as any application capable of displaying web content. The application may be implemented with a processor such as a personal computer, personal digital assistant, mobile phone, or any other machine capable of implementing a web application.

The users 120AA-NN may also interact individually with the service provider 130, through the mobile network operators 115A-N, such as via a mobile phone or any mobile device capable of communicating with the mobile network operators 115A-N. The users 120AA-NN may interact with the service provider 130 via a mobile web based application, a mobile standalone application, or any application capable of running on a mobile device. The service provider 130 may communicate data to the revenue generators 110A-N over a network and to the users 120AA-NN over a network via the MNOs 115A-N. The following examples may refer to a revenue generator A 110A as an online advertiser or mobile advertiser; however the system 100 may apply to any revenue generators 110A-N who may desire to serve advertisements over mobile devices.

A revenue generator A 110A who is an mobile advertiser may maintain one or more accounts with the service provider 130. For each account the revenue generator A 110A may maintain one or more campaigns. For each campaign the revenue generator A 110A may maintain one or more listings. A listing may include a keyword, or a category, and one or more mobile message listings. Each mobile message listing may include an advertisement title, an advertisement description, a bid amount and a mobile site URL, if any. A mobile message listing may represent an association between a keyword, or a category, and a mobile advertisement. The listing may also include an option to have the advertisement displayed to users over any mobile messages. The revenue generators 110A-N may be able to specify demographic characteristics, such as age, gender, etc, they wish their advertisement to be targeted to. The revenue generators 110A-N may be able to specify a minimum number of mobile messages to have their advertisement attached to per month.

If the revenue generator A 110A does not have a mobile site URL for the MNO A 115A, the revenue generator A 110A may still bid on a keyword for the MNO A 115A. In this case, the service provider 130 may dynamically create a "WAP ad." The "WAP ad" may be an offer landing page containing the phone number of the advertiser and/or the logo of the advertiser. When a user AA 120AA clicks on the advertisement of the revenue generator A 110A who does not have a mobile site, the user AA 120AA may be taken to a page showing the phone number and/or logo of the revenue generator A 110A. The user AA 120AA may then use their mobile device to call the phone number of the revenue generator A 110A and complete their transaction. The data associated with the "WAP ad" may be stored in the advertisement title and/or the advertisement description fields.

The keywords may represent one or more terms that the revenue generator A 110A wishes to associate with their advertisement. If the keywords appear in a mobile message, the advertisement of the revenue generator A 110A may be attached to the mobile message. The category may represent a category of mobile messages that the revenue generator A 110A wishes their advertisement to be associated with, such as "sports." The advertisement title may represent the data the revenue generator A 110A wishes to be displayed to a user AA 120AA. Alternatively or in addition, the advertisement description may represent the data the revenue generator A 110A wishes to be displayed to a user AA 120AA when the user AA 120AA receives a mobile message containing the keyword. The mobile site URL may represent the link the revenue generator A 110A wishes a user AA 120AA to be directed to upon clicking on the mobile advertisement of the revenue generator A 110A, such as the home page of the revenue generator A 110A. The bid amount may represent a maximum amount the revenue generator A 110A may be willing to pay each time a user AA 120AA may click on the mobile advertisement of the revenue generator A 110A or each time the mobile advertisement of the revenue generator A 110A may be shown to a user AA 120AA, such as in a mobile message.

The revenue generators 110A-N may bid on categories of mobile messages to target their advertisements to, such as sports, finance, or generally any category capable of classifying mobile messages. Alternatively or in addition the revenue generators 110A-N may bid on mobile messages sent via a particular carrier, network or to/from a particular publisher. The revenue generators 110A-N may bid on any messages sent via a particular carrier, network or to/from a particular publisher, or the revenue generators 110A-N may bid on specific keywords that appear in messages or categories of messages sent via a particular carrier, network or to/from a particular publisher. More detail regarding the aspects of mobile advertising systems, as well as their structure, function and operation, can be found in commonly owned U.S. patent application Ser. No. 11/712,276, filed on Feb. 28, 2007, entitled, "SYSTEM FOR SERVING ADVERTISEMENTS OVER MOBILE DEVICES", which is hereby incorporated herein by reference in its entirety. The systems and methods herein associated with mobile advertising systems may be practiced in combination with methods and systems described in the above-identified patent application incorporated by reference.

The service provider 130 may utilize a flat rate advertising model, such as offering a "flat rate-card" to the revenue generators 110A-N. A "flat rate-card" may offer the revenue generators 110A-N the opportunity to purchase a fixed number of mobile messages which their advertisement may be attached to over a given time period, such as month. The fee for this service may be a flat-rate fee and may recur on a periodic basis, such as monthly. For example, a revenue generator A 110A may pay ten dollars per month to have their advertisement attached to two thousand mobile messages per month. The revenue generators 110A-N may combine the flat rate model with any of the aforementioned targeting mechanisms, such as messages relating to a particular keyword, category, network, carrier or publisher. Alternatively or in addition the revenue generators 110A-N may elect to have their advertisements attached to any mobile messages, without restriction.

The flat rate fee may be based on the number of users 120A-N who actually click on an advertisement of a revenue generator A 110A, measured by a cost per click ("CPC"). Alternatively or in addition the flat rate fee may be based on the number of impressions of an advertisement of a revenue generator A 110A. The number of impressions may refer to the number of times users 110A-N view the advertisement of the revenue generator A 110A. The impressions may be measured by cost per mille ("CPM"), which may refer to the cost per one thousand impressions.

The service provider 130 may use metrics related to the number of mobile messages sent in previous months to determine a projection of the number of mobile messages which may be sent in subsequent months. The service provider 130 may use the projections to sell advertisements attached to a guaranteed number of mobile messages, such as two thousand mobile messages. The revenue generators 110A-N may pay a premium amount or an extra fee to purchase have their advertisement attached to a guaranteed number of mobile messages over a given time period, such as a month. Alternatively or in addition, the revenue generators 110A-N may pay less for a non-guaranteed number of advertisements over a given time period, such as a month. The concept of guaranteed and non-guaranteed advertisements may be incorporated with the above mentioned "flat rate-card" model.

There may be some instances where multiple revenue generators 110A-N may have bid on the same keywords targeted to mobile messages. The service provider 130 may serve to the users 120AA-NA the online advertisements that the users 120AA-NA may be most likely to click on. For example, the service provider 130 may include a relevancy assessment to determine the relevancy of the multiple mobile advertisements to the keywords. The more relevant a mobile advertisement may be to the keyword the more likely it may be that the user AA 120AA may click on the advertisement. Methods for assessing relevancy in online web search marketing may also apply to mobile messaging marketing.

In operation, one of the MNOs 115A-N, such as the MNO 115A, may receive a mobile message to be communicated to one of the users 120AA-AN, such as the user AA 120AA. The MNO 115A may then request an advertisement from the service provider 130. In one instance, the short message service center ("SMSC") component of the MNOs 115A-N may receive the mobile message and request the advertisement from the service provider 130. The request may include information describing the message, the sender, the recipient, such as the user AA 120AA, or generally any information that may be used to target an advertisement.

The information describing the recipient and/or the source may include the type of mobile device the recipient is using, demographic information of the recipient, such as gender, age, location of the recipient, etc., or generally any information describing the recipient that may be used to target an advertisement. The information describing the source may also indicate whether the source of the message was an external short messaging entity ("ESME"), such as a voting system response, or generally any information regarding the ESME that may be used to target an advertisement. The information describing the message may include the message length, the entire content of the message, keywords from the content of the message, a category of the message, or generally any information about the message that may be used to target an advertisement. Alternatively or in addition, the MNOs 115A-N may supply different amounts of information with the ad request.

The information received with the ad request may be applied to existing client browser targeting mechanisms of the service provider 130. The service provider 130 may use any or all of the received information to target an advertisement, such as targeting the advertisement to the specific mobile device, the user AA 120AA, the time of the day, the location of the user, the source of the message, or generally using any of the information supplied by the MNO A 115A. The advertisement may be communicated back to the MNO A 115A. The MNO 115A may attach the advertisement to the mobile message and communicate the mobile message to the user AA 120AA. Alternatively or in addition the MNO A 115A may communicate the entire message to the service provider 130. The service provider 130 may attach an advertisement to the message and may communicate the message, with the advertisement attached, to the MNO A 115A. The MNO A 115A may then communicate the message, with the advertisement attached to the user AA 120AA. The service provider 130 may store data regarding the user AA 120AA and the advertisement. The data may include the demographics of the user AA 120AA and whether the user AA 120AA clicked on the advertisement in the mobile message.

Alternatively or in addition the content of the message, if received, may be targeted with a content matching system. The service provider 130 may implement a content matching system. The content matching system may process the words on a given message to determine a set of terms. The set of terms may be the most commonly occurring words, or may be determined by some other factor. The set of terms may then be used to determine which of the content match advertisements to display. The content matching system may use the set of terms to select advertisements, such as by selecting the advertisements which contain the most number of words matching the set of terms. The set of terms may be referred to as a query or a content match query.

Alternatively or in addition, the MNOs 115A-N may display advertisements within the mobile applications of the users 120AA-NN. For example, the mobile messaging applications of the users 120AA-NN may have an ad slot where the MNOs 115A-N may display advertisements. The MNOs 115A-N may request a batch of advertisements from the service provider 130 for display on the mobile applications of each of the users 120AA-NN. The MNOs 115A-N may communicate data relating to each of the individual users 120AA-NN to the service provider 130. The service provider 130 may use the data relating to each of the individual users 120AA-NN to retrieve advertisements relating to each of the users 120AA-NN. The service provider 130 may then communicate the batches of advertisements for each of the users 120AA-NN to the MNOs 115A-N. The MNOs 115A-N may then display the advertisements in the mobile applications of each of the users 120AA-NN, such as mobile messaging applications.

More detail regarding the aspects of auction-based systems, as well as the structure, function and operation of the service provider 130, as mentioned above, can be found in commonly owned U.S. patent application Ser. No. 10/625,082, filed on Jul. 22, 2003, entitled, "TERM-BASED CONCEPT MARKET"; U.S. patent application Ser. No. 10/625,000, file on Jul. 22, 2003, entitled, "CONCEPT VALUATION IN A TERM-BASED CONCEPT MARKET" filed on Jul. 22, 2003; U.S. patent application Ser. No. 10/625,001, filed on Jul. 22, 2003, entitled, "TERM-BASED CONCEPT INSTRUMENTS"; and U.S. patent application Ser. No. 11/489,386, filed on Jul. 18, 2006, entitled, "ARCHITECTURE FOR AN ADVERTISEMENT DELIVERY SYSTEM," all of which are hereby incorporated herein by reference in their entirety. The systems and methods herein associated with ad campaign management may be practiced in combination with methods and systems described in the above-identified patent applications incorporated by reference.

Furthermore, the service provider 130 may generate reports based on the data collected from the users 120AA-NN and communicate the reports to the revenue generators 110A-N to assist the revenue generators 110A-N in measuring the effectiveness of their mobile advertising. The reports may indicate the number of times the users 120AA-NN viewed a mobile advertisement of the revenue generators 110A-N, the number of times a mobile advertisement of the revenue generators 110A-N was clicked on by the users 120AA-NN, or generally any information useful to the revenue generators 110A-N. There may be a separate report for each MNO 115A-N the advertisement of the revenue generator A 110A was displayed on. The reports may also generally indicate any data that may assist the revenue generators 110A-N in measuring the effectiveness of their mobile advertising campaigns.

Figure 2:
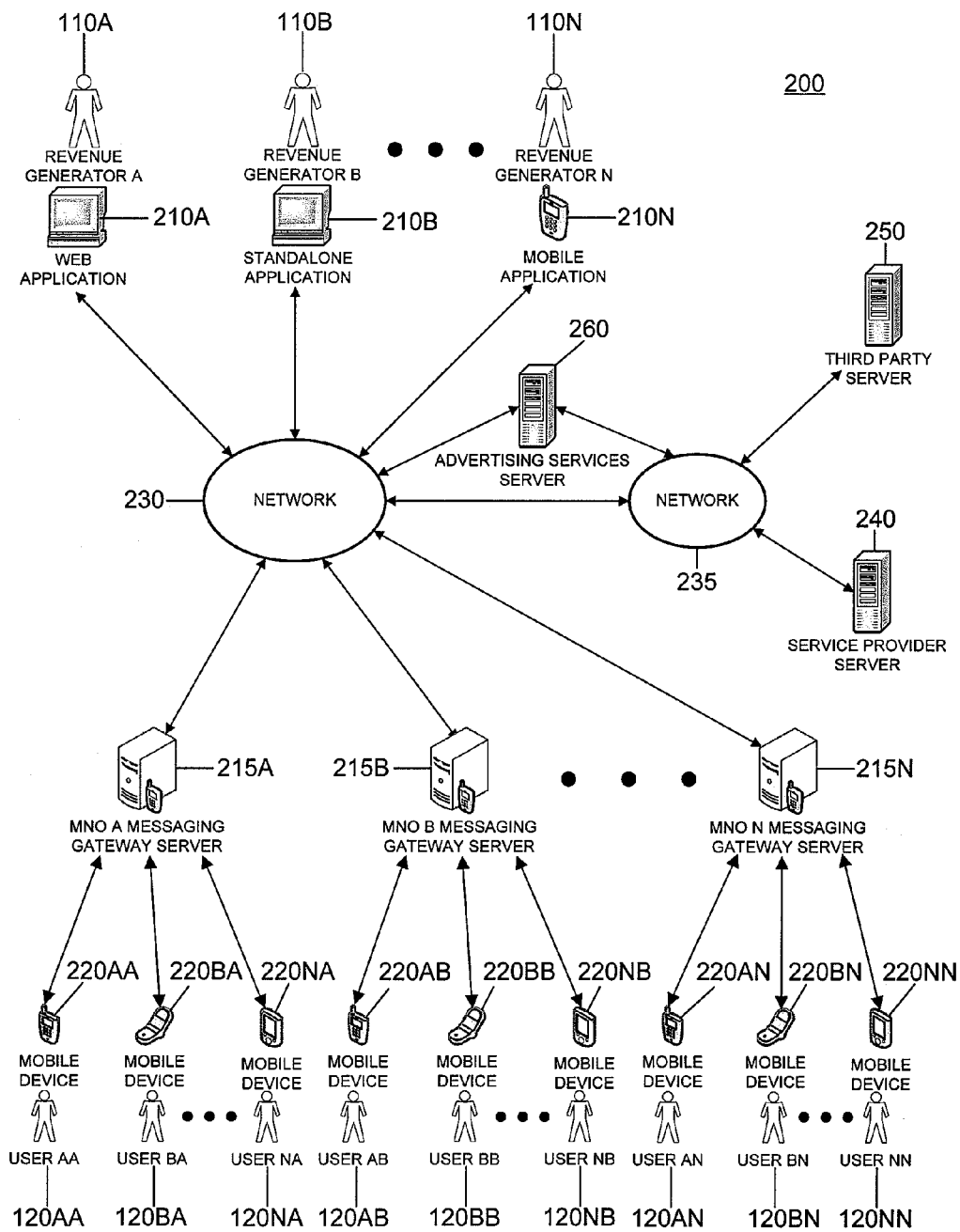
FIG. 2 is block diagram of a simplified view of a network environment implementing the system of FIG. 1 or other systems for serving targeted advertisements over mobile messaging services.

FIG. 2 provides a simplified view of a network environment implementing a system 200 for serving targeted advertisements over mobile messaging services. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The system 200 may include one or more web applications, standalone applications and mobile applications 210A-N, which may be collectively or individually referred to as client applications of the revenue generators 110A-N. The system 200 may also include one or more mobile applications, or mobile apps, which may be running on one or more mobile devices 220AA-NN. The system 200 may also include one or more MNO messaging gateway servers 215A-N, a network 230, a network 235, the service provider server 240, a third party server 250, and an advertising services server 260.

Some or all of the advertisement services server 260, service provider server 240, and third-party server 250 may be in communication with each other by way of network 235 and may be the system or components described below in FIG. 11. The advertisement services server 260, third-party server 250 and service provider server 240 may each represent multiple linked computing devices. Multiple distinct third party servers, such as the third-party server 250, may be included in the system 200. The third-party server 250 may be an MNO messaging gateway server 215A-N or a server associated with, or in communication with an MNO messaging gateway server 215A-N.

The networks 230, 235 may include wide area networks (WAN), such as the internet, local area networks (LAN), campus area networks, metropolitan area networks, or any other networks that may allow for data communication. The network 230 may include the Internet and may include all or part of network 235; network 235 may include all or part of network 230. The networks 230, 235 may be divided into sub-networks. The sub-networks may allow access to all of the other components connected to the networks 230, 235 in the system 200, or the sub-networks may restrict access between the components connected to the networks 230, 235. The network 235 may be regarded as a public or private network connection and may include, for example, a virtual private network or an encryption or other security mechanism employed over the public Internet, or the like.

The revenue generators 110A-N may use a web application 210A, standalone application 210B, or a mobile application 210N, or any combination thereof, to communicate to the service provider server 240, such as via the networks 230, 235. The service provider server 240 may communicate to the revenue generators 110A-N via the networks 230, 235, through the web applications, standalone applications or mobile applications 210A-N.

The users 120AA-NN may use a mobile application running on a mobile device 220AA-220NN, such as a mobile web browser, to communicate with the service provider server 240, via the MNO messaging gateway servers 215A-N and the networks 230, 235. The service provider server 240 may communicate to the users 120AA-NN via the networks 230, 235 and the MNO messaging gateway servers 215A-N, through the mobile devices 220AA-NN.

The web applications, standalone applications, mobile applications and mobile devices 210A-N, 220AA-NN may be connected to the network 230 in any configuration that supports data transfer. This may include a data connection to the network 230 that may be wired or wireless. Any of the web applications, standalone applications and mobile applications 210A-N, may individually be referred to as a client application. The web application 210A may run on any platform that supports web content, such as a web browser or a computer, a mobile phone, personal digital assistant (PDA), pager, network-enabled television, digital video recorder, such as TIVO®, automobile and/or any appliance capable of data communications.

The standalone applications 210B may run on a machine that may have a processor, memory, a display, a user interface and a communication interface. The processor may be operatively connected to the memory, display and the interfaces and may perform tasks at the request of the standalone applications 210B or the underlying operating system. The memory may be capable of storing data. The display may be operatively connected to the memory and the processor and may be capable of displaying information to the revenue generator B 110B. The user interface may be operatively connected to the memory, the processor, and the display and may be capable of interacting with a revenue generator A 110A. The communication interface may be operatively connected to the memory, and the processor, and may be capable of communicating through the networks 230, 235 with the service provider server 240, third party server 250 and advertising services server 260. The standalone applications 210B may be programmed in any programming language that supports communication protocols. These languages may include: SUN JAVA, C++, C#, ASP, SUN JAVASCRIPT, asynchronous SUN JAVASCRIPT, or ADOBE FLASH ACTIONSCRIPT, amongst others.

The mobile application 210N may run on any mobile device which may have a data connection. The mobile applications 210N may be a web application 210A, a standalone application 210B, or a mobile browser. The mobile devices 220AA-NN may be one of a broad range of electronic devices which may include mobile phones, PDAs, and laptops and notebook computers. The mobile devices 220AA-NN may have a reduced feature set, such as a smaller keyboard and/or screen, and may be incapable of supporting a traditional web search.

The data connection of the mobile devices 220AA-NN may be a cellular connection, such as a GSM/GPRS/WCDMA connection, a wireless data connection, an internet connection, an infra-red connection, a Bluetooth connection, or any other connection capable of transmitting data. The data connection may be used to connect directly to the network 230, or to connect to the network 230 through the MNO messaging gateway servers 215A-N.

The MNO messaging gateway servers 215A-N may control the access the mobile devices 220AA-NN may have to the network. The MNO messaging gateway servers 215A-N may also control the technology supporting the respective mobile devices 220AA-NN. This may affect aspects of the user experience, such as signal strength and availability, speed and billing mechanisms. For example, the MNO messaging gateway server A 215A may only allow the users 120AA-NA access to content provided by partners of the MNO A 115A. Furthermore, the MNO messaging gateway servers 215A-N may only allow users 120AA-NN access to data in a specific format, such as WML, XHTML, NTT DOCOMO IMODE HTML, or cHTML. Alternatively or in addition, the mobile devices 220AA-NN may only support one of the aforementioned formats.

The MNOs 115A-N may utilize various components to provide these services to the users 120AA-NN, such as network switching systems ("NSS"), mobile switching centers ("MSC"), mobile switching center servers ("MSC-S"), home location registers ("HLR"), authentication centers ("AUC"), short message service centers ("SMSC"), signal transfer points ("STP"), message service centers ("MSC"), or generally any component that may be utilized to provide the mobile services. The MNOs 115A-N may interface with one or more external short messaging entities (ESME), such as the third party server 250, which may connect to the MNOs 115A-N to send and/or receive mobile messages to the users 120AA-NN. The ESMEs may provide voicemail, web, email, or other services to the users 120AA-NN of the MNOs 115A-N.

The service provider server 240 may include one or more of the following: an application server, a data source, such as a database server, a middleware server, and an advertising services server. One middleware server may be a mobile commerce platform, such as the YAHOO! SUSHI platform, which may properly encode data, such as mobile pages or mobile advertisements, to the formats specific to the MNO messaging gateway servers 215A-N. The service provider server 240 may co-exist on one machine or may be running in a distributed configuration on one or more machines. The service provider server 240 may collectively be referred to as the server. The service provider server 240 may receive requests from the users 120AA-NN and the revenue generators 110A-N and may serve mobile pages to the users 120AA-NN and web pages and/or mobile pages to the revenue generators 110A-N based on their requests.

The third party server 250 may include one or more of the following: an application server, a data source, such as a database server, a middleware server, and an advertising services server. The third party server 250 may co-exist on one machine or may be running in a distributed configuration on one or more machines. Alternatively or in addition, the third party server may be an ESME server. The advertising services server 260 may provide a platform for the inclusion of advertisements in pages, such as web pages or mobile pages. The advertisement services server 260 may be used for providing mobile advertisements that may be displayed to the users 120AA-NN.

Figure 11:
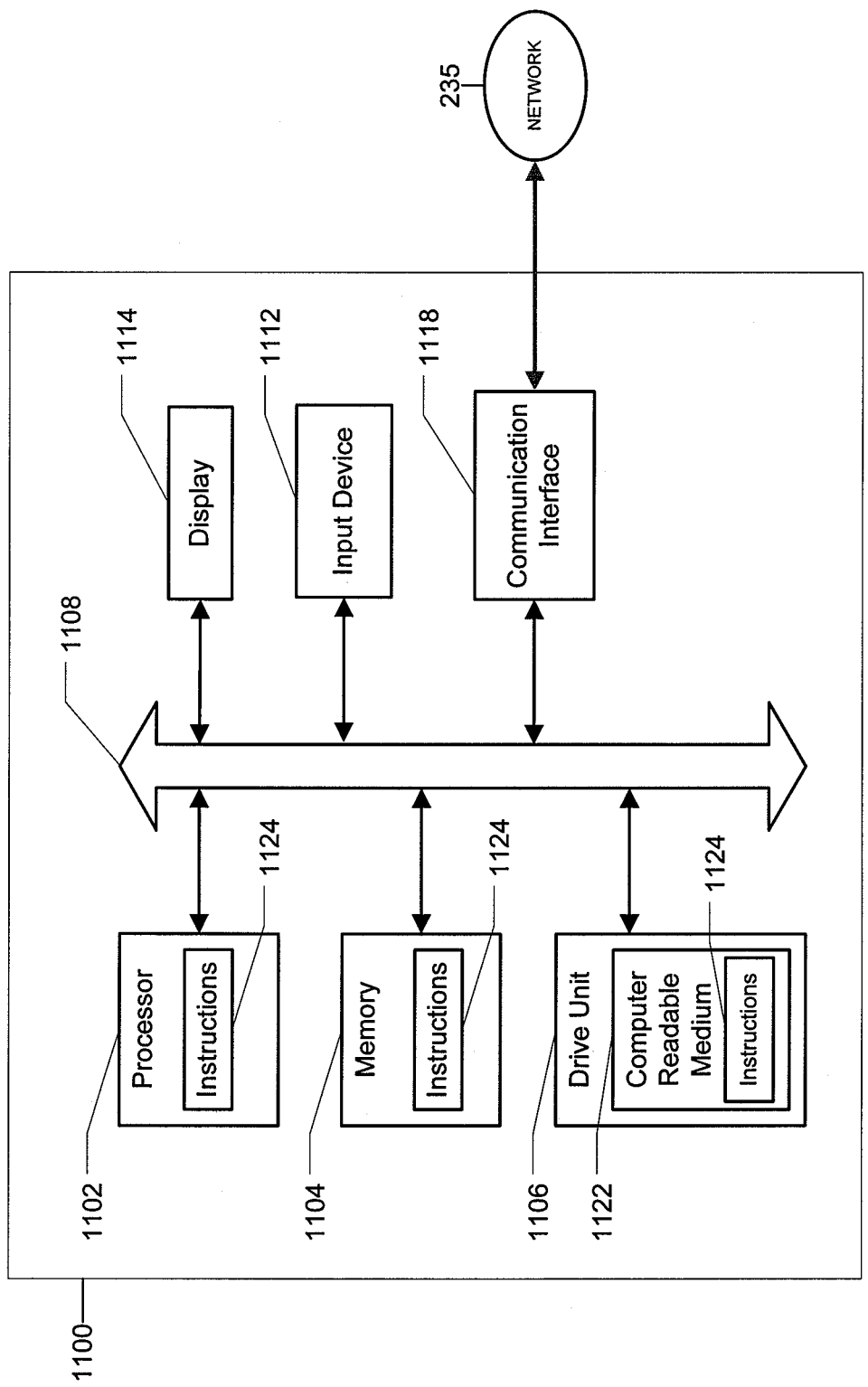
FIG. 11 is an illustration a general computer system that may be used in a system for serving targeted advertisements over mobile messaging services.

The service provider server 240, the third party server 250 and the advertising services server 260 may be one or more computing devices of various kinds, such as the computing device in FIG. 11. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web application 210A may employ HTTP to request information, such as a web page, from a web server, which may be a process executing on the service provider server 240 or the third-party server 250.

There may be several configurations of database servers, application servers, middleware servers and advertising services servers included in the service provider server 240 or the third party server 250. Database servers may include MICROSOFT SQL SERVER, ORACLE, IBM DB2 or any other database software, relational or otherwise. The application server may be APACHE TOMCAT, MICROSOFT IIS, ADOBE COLDFUSION, YAPACHE or any other application server that supports communication protocols. The middleware server may be any middleware that connects software components or applications. The application server on the service provider server 240 or the third party server 250 may serve pages, such as web pages to the users 120AA-NN and the revenue generators 110A-N. The advertising services server may provide a platform for the inclusion of advertisements in pages, such as web pages. The advertising services server 260 may also exist independent of the service provider server 240 and the third party server 250.

The networks 230, 235 may be configured to couple one computing device to another computing device to enable communication of data between the devices. The networks 230, 235 may generally be enabled to employ any form of machine-readable media for communicating information from one device to another. Each of networks 230, 235 may include one or more of a wireless network, a wired network, a local area network (LAN), a wide area network (WAN), a direct connection such as through a Universal Serial Bus (USB) port, and the like, and may include the set of interconnected networks that make up the Internet. The networks 230, 235 may include any communication method by which information may travel between computing devices.

Figure 3:
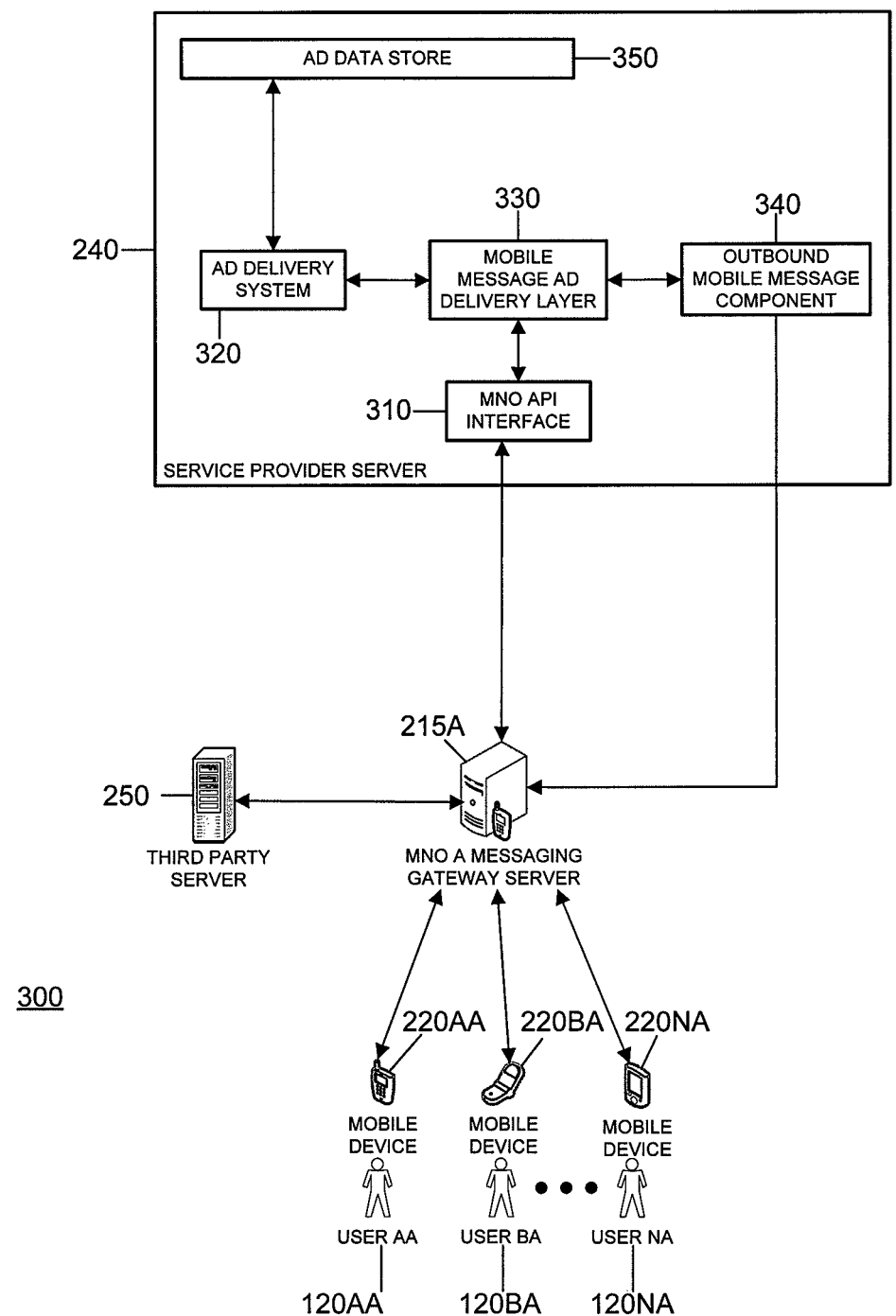
FIG. 3 is a block diagram of an implementation of the system of FIG. 1 or other systems for serving targeted advertisements over mobile messaging services.

FIG. 3 illustrates a block diagram of an implementation of the system of FIG. 1 or other systems for serving targeted advertisements over mobile messaging services. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The system 300 may include the service provider server 240, the third party server 250, such as an ESME server, the MNO A messaging gateway server 215A, the mobile devices 220AA-NA, and the users 120AA-NA. The service provider server 240 may include an MNO API interface 310, a mobile message ad delivery layer 330, an outbound mobile message component 340, an ad delivery system 320, and an ad data store 350.

In operation, the user AA 120AA may send a mobile message to the user BA 120BA. The message may be routed through the MNO A messaging gateway server 215A. The MNO A messaging gateway server 215A may make an advertisement request to the service provider 240, via the MNO API interface 310. The request may include information describing the user AA 120AA, the user BA 120BA, the content of the message, or some derivative of the content of the message, and generally any information that may be used to target an advertisement. The request may also include the length of the message, as the total length of the message, including the advertisement, may be limited to a fixed number of characters, such as 160.

The MNO API interface 310 may communicate the request to the mobile message ad delivery layer 330. The mobile message ad delivery layer 330 may process the request to format the data from the request into a standardized form used by the ad delivery system 320. The ad delivery system 320 may also supply ads for client browser based targeting. The processing of the data may include generating content match keywords from the content of the message, or parsing the demographic information of the recipient. The mobile message ad delivery layer 330 may also determine the maximum length the advertisement may be to comply with the space restrictions of mobile messaging.

The mobile message ad delivery layer 330 may also determine whether the data describing the recipient can be used to identify the recipient. For example, if the mobile message ad delivery layer 330 receives an address of the recipient, the mobile message ad delivery layer 330 may be able to match the address to an existing user ID on the service provider 130. If the recipient is identifiable, the historical behavior associated with their user ID may also be used to target an advertisement.

The mobile message ad delivery layer 330 may request an advertisement from the ad delivery system 320, based on the processed data from the ad request. The ad delivery system 320 may retrieve an ad from the ad data store 350 relating to the processed data. For example, if the MNO A 115A communicates the current location of the user BA 120BA to the service provider 130, the service provider 130 may retrieve an advertisement related to the current geographic location of the user BB 120BA.

The revenue generators 110A-N may elect to participate in the mobile messaging advertising and may provide a short mobile message advertisement in addition to their web advertisements. The short mobile message ad may be stored in the ad data store 350. Alternatively or in addition the ad delivery system 320 may use all or part of the title and/or description of an advertisement as a mobile message advertisement.

The ad delivery system 320 may then communicate the ad to the mobile message ad delivery layer 330. The mobile message ad delivery layer may shorten the link, or URL, associated with the advertisement, such as by storing a mapping from the original link to a shortened link. A short link may be necessary to comply with the space requirements of the mobile message. The mobile message ad delivery layer 330 may then communicate the text of the advertisement and the link to the MNO API interface 310. The MNO API interface 310 may then communicate the advertisement and link to the MNO A messaging gateway server 215A. The MNO A messaging gateway server 215A may attach the advertisement and the link to the mobile message, such as at the end of the message. The mobile message, with the attached advertisement, may be communicated to the intended recipient, the user BA 120BA.

The user BA 120BA may view the mobile message, with the attached advertisement, on their mobile device 220BA. If the user BA 120BA selects the link in the mobile message, the mobile web browser of the user BA 120BA may be opened and directed to the link represented by the short link. The short link may direct the mobile browser of the user BA 120BA to the service provider server 240. The service provider server 240 may store data indicating that the user BA 120BA clicked on the mobile message advertisement and may then redirect the browser of the user BA 120BA to the link mapped to the short link.

Alternatively or in addition, the MNO A messaging gateway server 215A may communicate the entire message to the MNO API interface 310. In this case, the mobile message ad delivery layer 330 may attach the advertisement and link directly to the mobile message. The mobile message, with the advertisement and link attached, may then be communicated back to the MNO A messaging gateway server 215A.

Alternatively or in addition the outbound mobile message component 340, may identify alerts that may be sent to the users 120AA-NA. The users 120AA-NA may have subscribed to the alerts, such as sports scores, news headlines or stock quotes. The alerts may be communicated to the users 120AA-NA via a mobile message, such as an SMS message. In this instance the service provider server 240 may be an ESME. The outbound mobile message component 340 may communicate an ad request to the mobile message ad delivery layer 330. The ad request may include information about the alert, such as the content of the alert or a category of the alert.

The mobile message ad delivery layer 330 may process the data communicated in the ad request so the data conforms to the inputs used by the ad delivery system 320 for client browser targeting. The processed data may then be communicated to the ad delivery system 320. The ad delivery system 320 may retrieve ads from the ad data store 350 based on the processed data. For example, if the category of the alert was sports, the ad delivery system 320 may search for sports advertisements or for advertisements of revenue generators 110A-N who requested their advertisement be displayed with sports messages.

The ad delivery system 320 may then communicate the advertisement to the mobile message ad delivery layer 330. The mobile message ad delivery layer 330 may attach the advertisement to the alert and communicate the alert, with the attached advertisement, to the outbound mobile message component 340. The outbound mobile message component 340 may then communicate the alert, with the attached ad, to the MNO A messaging gateway server 215A. The MNO A messaging gateway server 215A may then communicate the alert, with the attached advertisement, to the user AA 120AA, via the mobile device 220AA.

Alternatively or in addition the outbound mobile message component 340 may communicate the alert to the MNO A messaging gateway server 215A, without attaching an advertisement. In this case, the MNO A mobile messaging gateway server 215A may make an ad request to the MNO API interface 310 for the alert, as described above.

Figure 4:
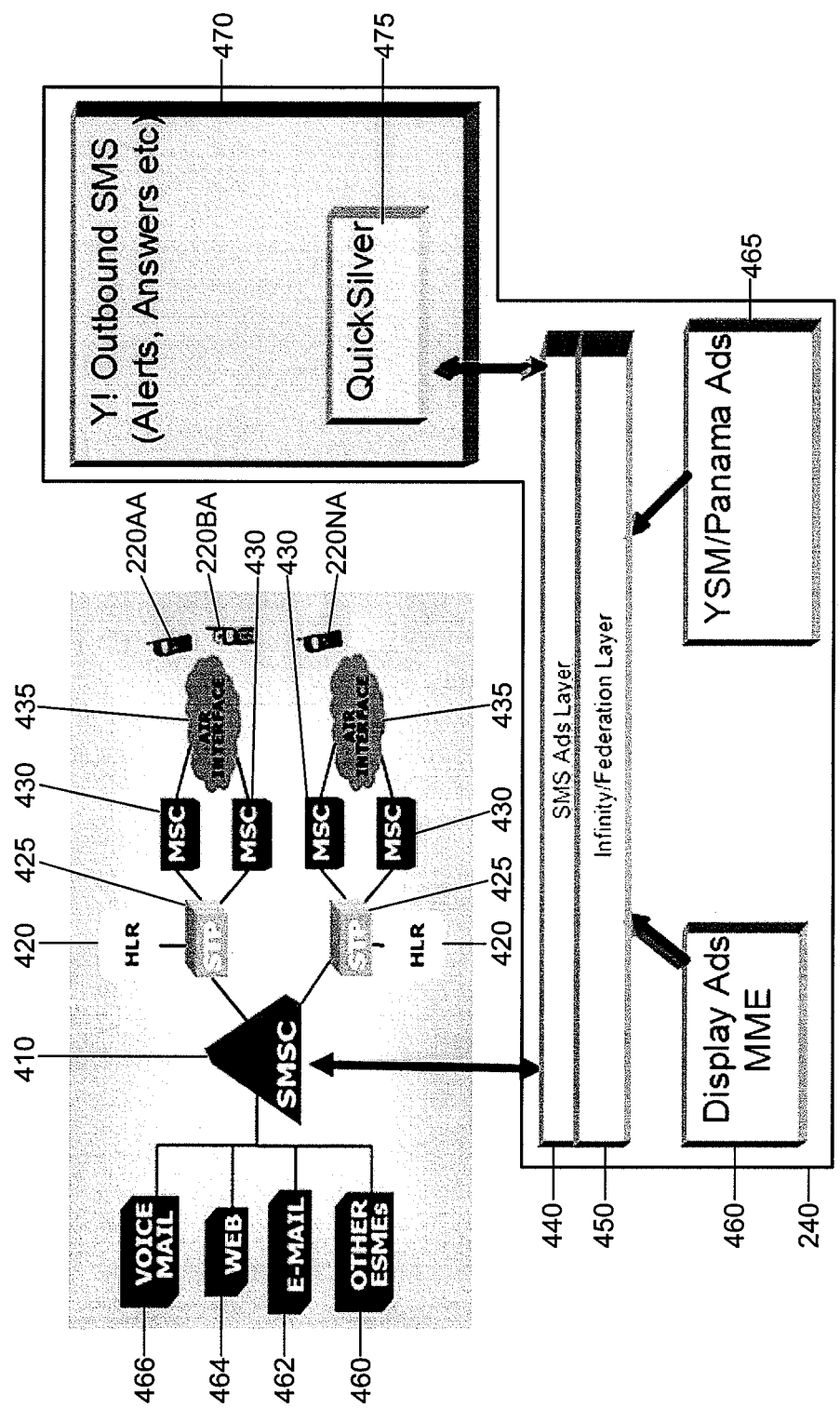
FIG. 4 is a block diagram of an implementation for a service provider of the system of FIG. 1 or other systems for serving targeted advertisements over mobile messaging services.

FIG. 4 illustrates a block diagram of an implementation by a mobile network operator A 115A and a service provider 130 of the system of FIG. 1 or other systems for serving targeted advertisements over mobile messaging services. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The system 400 may include a short message service center ("SMSC") 410, one or more home location registers ("HLR") 420, one or more signal transport point ("STP") 425, one or more mobile switching centers ("MSC") 430, one or more air interfaces 435, one or more mobile devices 220AA-220NA, a voicemail ESME 466, a web ESME 464, an email ESME 462, other ESMEs 460, and a service provider server 240. The service provider server 240 may include an SMS Ads Layer 440, an Infinity/Federation Layer 450, a Display Ads MME 460, a YSM/Panama Ads 465, an outbound SMS 470, and a QuickSilver component 475.

The MNO A 115A may implement one or more mobile network components, such as the SMSC 410, the HLR 420, the STPs 425, the MSCs 430 and the air interfaces 435. The users 120AA-NA may interact with the MNO A 115A through the mobile devices 220AA-NA. The mobile devices 220AA-NA may interface with the MNO A 115A through the air interfaces 435, such as cell phone tower. The air interfaces 435 may communicate with the NNO A 115A through one of the MSCs 430. The MSCs 430 may assist the MNOs 115A-N in determining the location of the users 120AA-NA and in routing the mobile services of the users 120AA-NA to the MNO A 115A. The STPs 425 may route the communication data between the MSCs 430 and the SMSC 410. The HLRs 420 may be databases which may store information about each of the users 120AA-NA, authorized to access the MNO A 115A. The HLRs 420 may supply information about the users 120AA-NA to the SMSC 410. The SMSC 410 may interface with ESMEs, such as the voicemail ESME 466, the web ESME 464, the email ESME 462 or other ESMEs 460. The ESMEs may provide additional services to the users 120AA-NA via mobile messaging.

The service provider server 240 may implement one or more of the SMS Ads Layer 440, the Infinity/Federation Layer 450, the Display Ads 460, the YSM/Panama Ads 465, the outbound SMS 470 and the Quicksilver component 475. The SMS Ads Layer 440 may receive requests for advertisements from the MNO A 115A and may communicate advertisements to the MNO A 115A. The Display Ads MME 460 and the YSM/Panama Ads 465 may be two advertisements stores that may be utilized by the SMS Ads Layer 440. The Infinity/Federation Layer 450 may be a client browser advertisement delivery mechanism that may provide a seamless integration of both the Display Ads MME 460 and the YSM/Panama Ads 465. The outbound SMS 470 may identify when alerts should be sent to the users 120AA-NN and the Quick-Silver component 475 may assist in communicating the alerts to the SMS Ads Layer 440 for advertisement inclusion or in communicating the alerts directly to the users 120AA-NA.

In operation, one the of the users 120AA-NA, such as the user AA 120AA may send a mobile message. The mobile device 220AA of the user AA 120AA may interface with the MNO A 115A via the air interface 435, such as a mobile phone tower. The air interface 435 may interact with one of the MSCs 430. The MSCs 430 may utilize the STPs 425 and/or the HLRs 420 to communicate the message to the SMSC 410.

The SMSC 410 may send and receive mobile messages to/from the users 120AA-NA; thus, in this instance, the SMSC 410 may be the MNO A messaging gateway server 215A. If the recipient user is not available, the SMSC 410 may store the mobile message and send it when the recipient user becomes available. The message may be routed back through to one of the users 120AA-NA on the MNO A 115A, or the message may be routed to users 120BA-NN of one of the other MNOs 115B-N. Upon receiving the mobile message, the SMSC 410 may make a request for an advertisement from the service provider server 240 via the SMS Ads layer 440. The SMSC 410 may receive information pertaining to the user AA 120AA from the HLRs 420. The information may be communicated to the SMS Ads layer 440 as part of the request for an advertisement. The SMS Ads layer 440 may interface with the Infinity/Federation Layer 450 to retrieve advertisements from either the Display Ads MME 460, or the YSM/Panama Ads 465. The SMS Ads Layer 440 may then communicate the advertisement back to the SMSC 410.

In the case of a mobile messaging alert, the outbound SMS 470 may communicate the outbound alert to the SMS Ads Layer 440 via the QuickSilver component 475. The SMS Ads Layer 440 may retrieve an ad for the alert from the Display Ads Mme 460 or the YSM/Panama Ads 465, via the Infinity/Federation Layer 450. The SMS Ads Layer 440 may then attach an advertisement to the alert and communicate the alert, with the advertisement attached, to the SMSC 410. The SMSC 410 may communicate the alert, with the attached advertisement, to one of the mobile devices 220AA-NA of one of the users 120AA-NA, via the STPs 425, HLRs 420, MSCs 430 and air interfaces 435.

Figure 5:
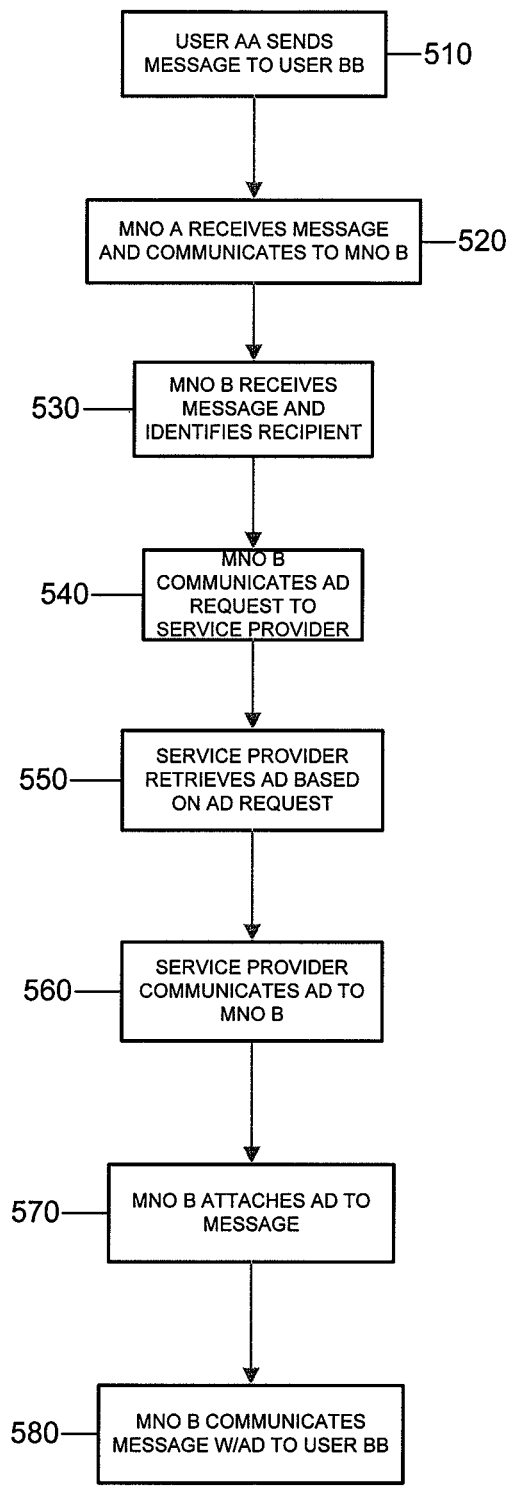
FIG. 5 is a flowchart illustrating operations of delivering advertisements through user to user mobile messaging in the systems of FIG. 1, or other systems for serving targeted advertisements over mobile messaging services.

FIG. 5 is a flowchart illustrating operations of delivering advertisements through user to user mobile messaging in the system of FIG. 1, or other systems for serving targeted advertisements over mobile messaging services. At block 510, the user AA 120AA may send a mobile message, from the mobile device 220AA to the user BB 120BB. The mobile device 220AA may communicate the message to the MNO A 115A.

At block 520, the MNO A 115A may receive the message from the user AA 120AA. The MNO A 115A may identify the destination of the message and communicate the message to the MNO B 115B. At block 530, the MNO B 115B may receive the message and may identify the recipient as the user BB 120BB. The MNO B 115B may be able to access the account of the user BB 120BB and all of the data associated with the account of the user BB 120BB. This data may include the call history of the user BB 120BB, the mobile messaging history of the user BB 120BB, the data usage of the user BB 120BB, the payment mechanism of the user BB 120BB, the address of the user BB 120BB, the current location of the user BB 120BB, or generally any information that the MNO B 115B may have access to pertaining to the user BB 120BB.

At block 540, the MNO B 115B may communicate an ad request to the service provider 130. The ad request may include data pertaining to the message, data pertaining to the user AA 120AA, data pertaining to the user BB 120BB, or generally any data that may be used to target an advertisement of one of the revenue generators 110A-N. The data may include the length of the message, the entire content of the message, or some subset or categorization of the content of the message. The data may include some or all of the data relating to the account of the user BB 120BB.

At block 550 the service provider 130 may receive the ad request and may retrieve an advertisement based on the data describing the message, the sender of the message, the recipient of the message, or any other data communicated by the MNO B 115B. The service provider 130 may process the data to put it into a standardized format accepted by the existing client browser based targeting systems of the service provider 130. By using the existing client browser based targeting systems the service provider 130 may seamlessly interface mobile messaging advertising with existing behavioral data and with existing advertisements of the revenue generators 110A-N.

The service provider 130 may also incorporate the length of the message as an input for retrieving the advertisement. The mobile message may be limited to a fixed number of characters. Thus, the service provider 130 may only retrieve advertisements that meet the space limitations of the mobile message. In order to shorten the message, the service provider 130 may implement a URL mapping system. The URL mapping system may replace the URL of the advertiser associated with an advertisement with a shortened URL. The shortened URL may refer to the service provider 130. When the users 120AA-NN click on a shortened URL, they may be directed to the service provider 130. The service provider 130 may then use the URL mapping system to redirect the users 120AA-NN to the web site of the revenue generator A 110A associated with the advertisement. The service provider 130 may also use the URL redirect to store data describing the interaction with the users 120AA-NN, such as data describing that the users 120AA-NN clicked through on the URL of the advertisement. This information may later be used for billing, targeting, or reporting purposes.

If the service provider 130 is unable to retrieve any mobile message advertisements, the service provider 130 may retrieve a client browser advertisement of one of the revenue generators 110A-N. The client browser advertisement may then be processed to convert it into a format acceptable for mobile messaging advertising. The formatting may consist of shortening the advertisement or of inserting the title of the advertisement or the description of the advertisement into a template, such as "Buy [TITLE]!" or "Visit [TITLE]."

At block 560 the service provider 130 may communicate the advertisement to the MNO B 115B. At block 570, the MNO B 115B attaches the advertisement to the mobile message. Alternatively or in addition if the MNO B 115B communicates the entire mobile message to the service provider 130, the service provider 130 may attach the advertisement to the message and communicate the mobile message and the advertisement to the MNO B 115B.

At block 580 the MNO B 115B communicates the mobile message, with the advertisement attached, to the mobile device 220BB of the user BB 120BB. The user BB 120BB may then view the mobile message, and the advertisement, via the mobile device 220BB. The user BB 120BB may click on, or select, the advertisement attached to the mobile message and may then be directed to the web site of the revenue generator A 110A associated with the advertisement. Alternatively or in addition clicking on the advertisement may cause the mobile device 220BB of the user BB 120BB to dial the phone number of the revenue generator A 110A.

Alternatively or in addition the high volume of mobile messages through the MNOs 115A-N may require that the MNOs 11SA-N cache advertisements rather than make an ad request for each mobile message. This may provide a scalable solution to accommodate for the increasing amount of mobile messages being sent by the users 120AA-NN. In this case, the MNOs 115A-N may request a batch of ads for one or more categories of mobile messages, such as sports, finance, etc. The MNOs 115A-N may maintain metrics describing how many of the advertisements were displayed to the users 120AA-NN and whether any of the users 120AA-NN clicked on any of the advertisements. The MNOs 115A-N may then communicate the metrics to the service provider 130 when requesting new batches of advertisements. In addition, the service provider 130 may supply the MNOs 115A-N with targeting mechanisms, such as a content matching system, in order to ensure that the MNOs 115A-N properly target the advertisements to the mobile messages.

Figure 6:
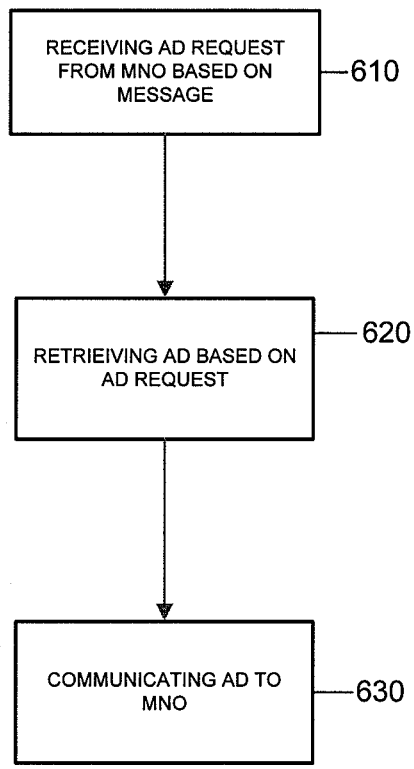
FIG. 6 is a flowchart illustrating operations of communicating an advertisement to a mobile network operator in the system of FIG. 1, or other systems for serving targeted advertisements over mobile messaging services.

FIG. 6 is a flowchart illustrating operations of communicating an advertisement to a mobile network operator in the system of FIG. 1, or other systems for serving targeted advertisements over mobile messaging services. At block 610 the service provider 130 may receive an ad request from one of the MNOs 115A-N, such as the MNO A 115A. The ad request may be based on a mobile message from a third party to one of the users 120AA-NN, from one of the user 120AA-NN to another one of the users 120AA-NN, or from any source to one of the users 120AA-NNr. The ad request may include data that may describe various aspects of the mobile message, such as the content, the sender, the recipient, or generally any data that may be used to target an advertisement.

At block 620 the service provider 130 may retrieve an advertisement based on the data included in the ad request. The service provider 130 may utilize existing ad targeting mechanisms, such as those used in client browser targeting, to retrieve the advertisement. If the service provider 130 can link the recipient data included in the ad request with a known user, the service provider 130 may also use the behavioral data associated with the user to target the advertisement. The data may also include the length of the message, and/or the number of characters available for an advertisement. The service provider 130 may use this information to select an advertisement that meets the space requirements of the mobile messages. In order to meet the space requirements, the service provider 130 may implement a URL mapping system, which may allow for the URL associated with the advertisement to be shortened.

At block 630 the service provider 130 may communicate the advertisement back to the MNO A 115A. Alternatively or in addition, if the MNO A 115A communicates the entire message to the service provider 130, the service provider 130 may attach the advertisement to the mobile message and then communicate the message, with the advertisement attached, to the MNO A 115A.

Figure 7:
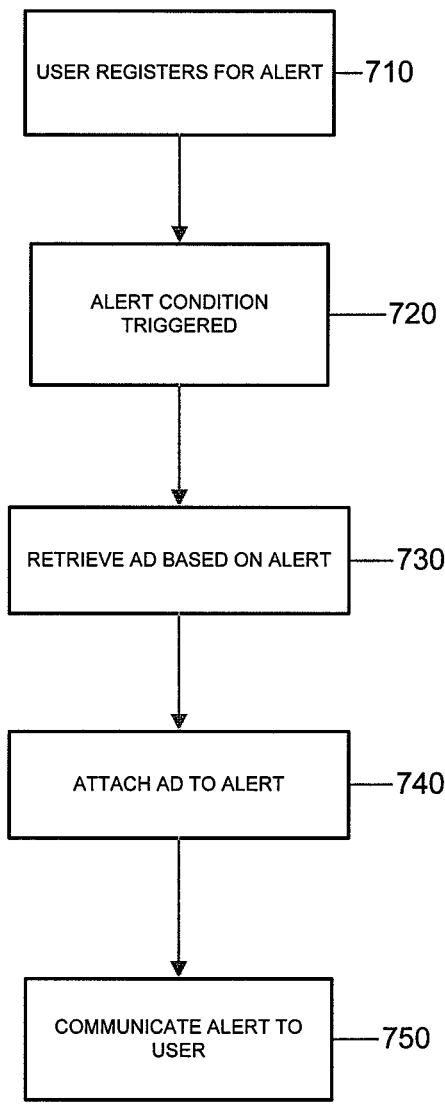
FIG. 7 is a flowchart illustrating operations of delivering an advertisement through a mobile messaging alert in the system of FIG. 1, or other systems for serving targeted advertisements over mobile messaging services.

FIG. 7 is a flowchart illustrating operations of delivering an advertisement through a mobile messaging alert in the system of FIG. 1, or other systems for serving targeted advertisements over mobile messaging services. At block 710 one of the users 120AA-NN, such as the user AA 120AA, may register for an alert. The user AA 120AA may register for the alert with the service provider 130 or with a third party. The alert may relate to a particular category, such as sports, news, finance, etc., and may convey information such as sports scores, news headlines, stock quotes, or generally any information that the user AA 120AA may wish to be alerted of. The alert may only be sent when a condition is met. The condition may be temporal, such as every hour, or the condition may be when an event occurs, such as when a sporting score changes or when a stock price reaches a threshold.

At block 720, the condition relating to the alert may be triggered. The condition may be triggered when a certain event occurs, such as the passage of time or a change in a score or stock quote. If the alert is being supplied by the service provider 130 the service provider 130 may generate the alert. If the alert is being supplied by a third party, the third party may communicate the alert, or data describing the alert and/or the recipient to the service provider 130. In this situation the system 100 may follow the operations described in FIG. 5.

At block 730, the service provider 130 may retrieve an advertisement based on the alert. The advertisement may relate to the content of the alert or may relate to the recipient of the alert. The user AA 120AA may need to be logged in with top the service provider 130 with a user ID to access the alerts functionality. The service provider 130 may have stored behavioral data associated with the user ID of the user AA 120AA and may use the behavioral data to target the advertisement. Alternatively or in addition the service provider 130 may target the advertisement based on the category of the alert, such as sports, finance, etc. The service provider 130 may need to determine the maximum message size supported by the MNO A 115A. The service provider 130 may need to ensure that when the advertisement is added to the message the combined message/advertisement does not exceed the maximum message length. The service provider 130 may implement a URL mapping system to map longer URLs to shorter URLs, thereby reducing the number of characters needed for the advertisement.

At block 740, the service provider 130 may attach the advertisement to the alert. The advertisement may be appended to the end of the alert. The service provider 130 may ensure that the mobile device 220AA of the user AA 120AA can support the underlying technology of the URL that the advertisement directs the user AA 120AA to. If the mobile device 220AA of the user AA 120AA does not support the technology implemented by the website referenced in the URL, then the service provider 130 may direct the user AA 120AA to a "WAP ad" or a call landing page. At block 750 the service provider 130 may communicate the alert to the user AA 120AA via the MNO A 115A. The user AA 120AA may then view the alert, and the advertisement, via the mobile device 220AA.

Alternatively or in addition the service provider 130 may communicate the alert, without an advertisement, to the MNO A 115A. The MNO A 115A, may then make an ad request back to the service provider 130 for the alert. If the alert does not have enough space for an advertisement, the alert may be communicated to the user AA 120AA without an advertisement attached.

Figure 8:
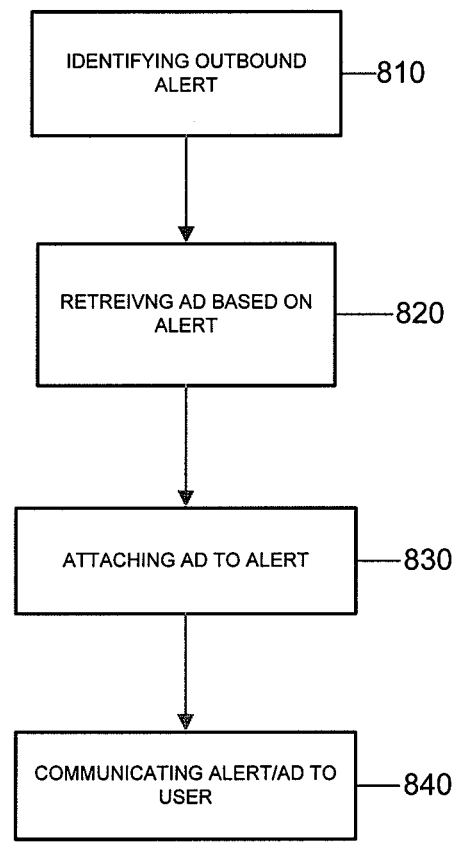
FIG. 8 is a flowchart illustrating operations of delivering an advertisement through a third party mobile messaging alert in the system of FIG. 1, or other systems for serving targeted advertisements over mobile messaging services.

FIG. 8 is a flowchart illustrating operations of delivering an advertisement through a third party mobile messaging alert in the system of FIG. 1, or other systems for serving targeted advertisements over mobile messaging services. At block 810 the service provider 130 may identify an outbound alert 810 to be communicated to one of the users 120AA-NN, such as the user 120AA. At block 820 the service provider 130 may retrieve an advertisement based on the alert. The advertisement may be based on the content of the alert, a category associated with the alert, the recipient of the alert, or generally any data describing the alert that may be used to target an advertisement. The service provider 130 may use existing client browser targeting mechanisms, such as content matching, to retrieve an advertisement for the alert. The total size of the alert may be limited to a maximum number of characters. The advertisement retrieved by the service provider 130 may be limited in size by the available space in the alert.

At block 830 the service provider 830 may attach the advertisement to the alert. The service provider 130 may append the advertisement to the end of the alert, may append the advertisement to the beginning of the alert, or generally may attach the advertisement to any part of the alert. At block 840 the service provider 130 may communicate the alert with the advertisement to the user AA 120AA, via the MNO A 115A. Alternatively or in addition the service provider 130 may communicate the alert, without an advertisement, to the MNO A 115A. The MNO A 115A may then make an ad request back to the service provider 130 to receive an advertisement for the alert.

Figure 9:
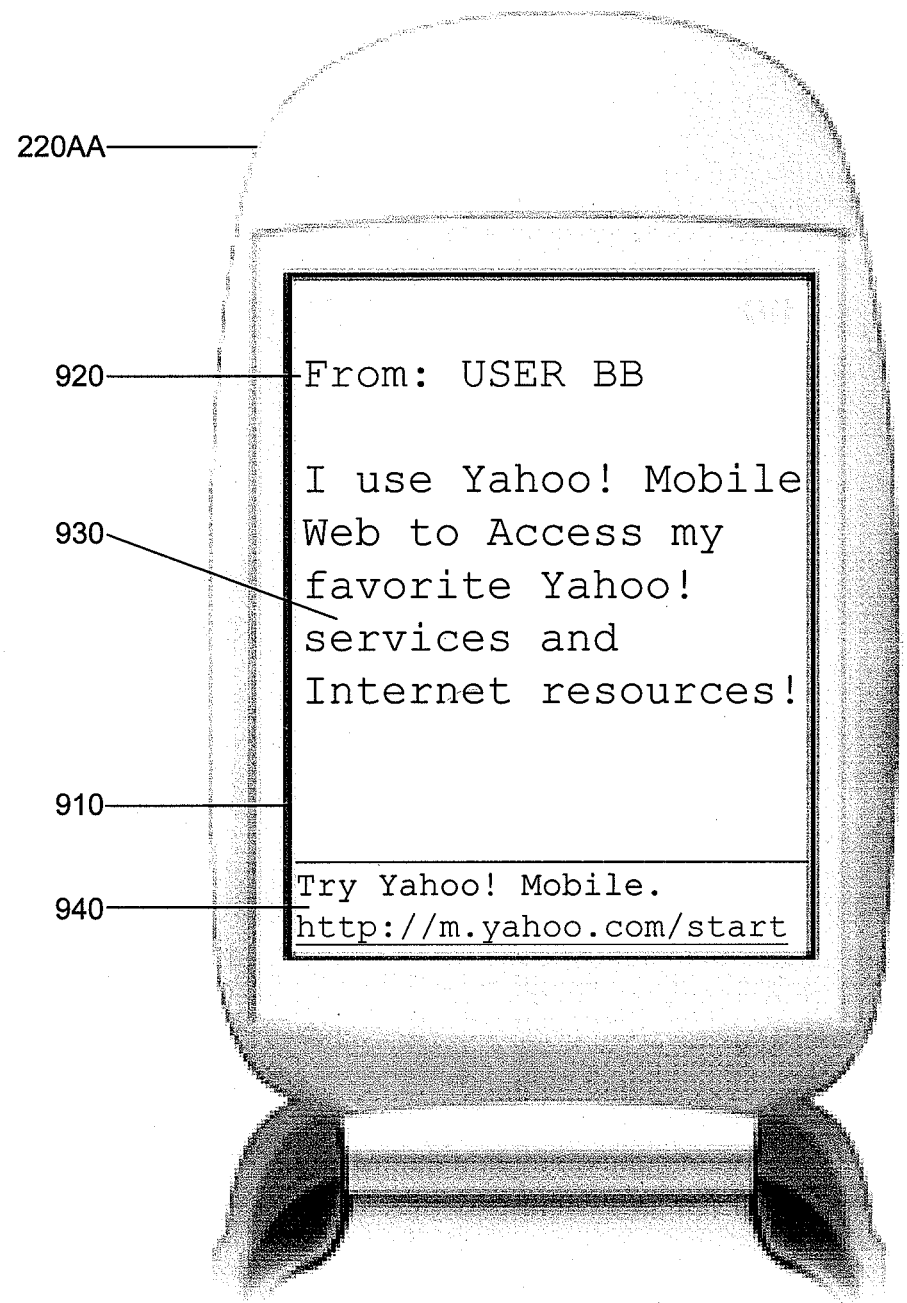
FIG. 9 is an illustration of a mobile device displaying a mobile message with a targeted advertisement attached by the system of FIG. 1 or other systems for serving targeted advertisements over mobile messaging services.

FIG. 9 illustrates a mobile device 220AA displaying a mobile message with a targeted advertisement attached by the system of FIG. 1 or other systems for serving targeted advertisements over mobile messaging services. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The mobile device 220AA of the user AA 120AA may include a display 910. When viewing a mobile message, the display 910 may display a sender 920, a message 930, and an advertisement 940. The display 910 may be displaying a mobile message received from the user BB 120BB. The advertisement 940 may have been attached to the mobile message by the service provider 130 or the MNO A 115A. The advertisement 940 may relate to the mobile message, or the recipient, the user AA 120AA.

For example, in FIG. 9, the mobile message 930 from the user BB 120BB regards "Yahoo! Mobile Web." The advertisement 940 attached to the message 930 may relate to "Yahoo! Mobile Web," such as "Try Yahoo! Mobile." The link associated with the advertisement 940, "http://m.yahoo.com/start," may have been shortened by the service provider 130 to fit within the space limitations of the message.

Figure 10:
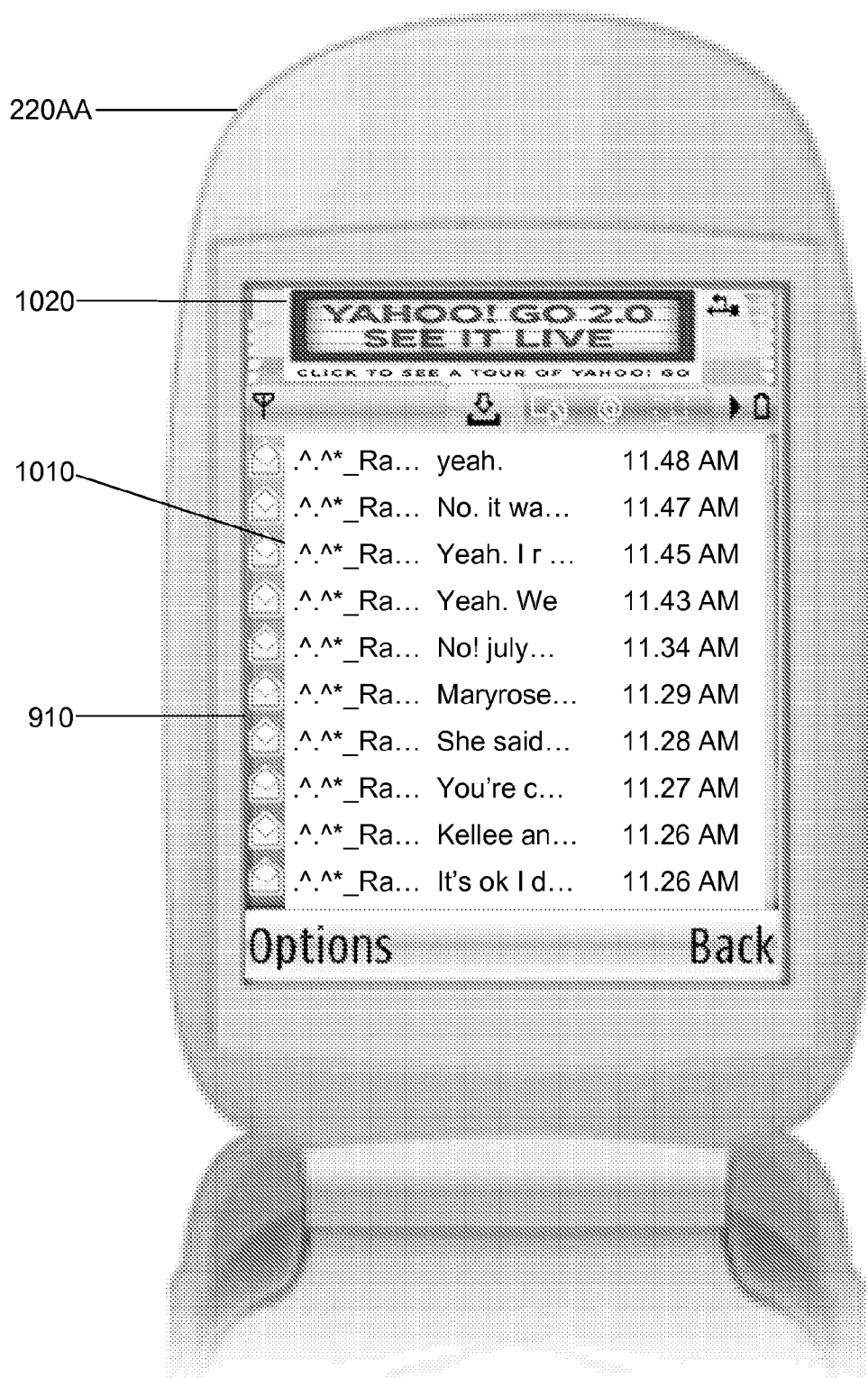
FIG. 10 is an illustration of a mobile device displaying a mobile messaging application including a targeted advertisement delivered by the system of FIG. 1 or other systems for serving targeted advertisements over mobile messaging services.

FIG. 10 illustrates a mobile device 220AA displaying a mobile messaging application including a targeted advertisement delivered by the system of FIG. 1 or other systems for serving targeted advertisements over mobile messaging services. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The mobile device 220AA may include a display 910. The display 910 may display a mobile messaging application 1010 and an advertisement 1020. The mobile messaging application 1010 may have space allotted for advertisements 1020 from the service provider 130 or the MNO A 115A. The advertisements may relate to the mobile messages in the mobile messaging application 1010, or may generally relate to the user AA 120AA. The MNO A 115A may have access to information relating to the user AA 120AA, such as home address, current location, etc. and may communicate this information to the service provider 130. The service provider 130 may then use the information to retrieve advertisements related to the user AA 120AA.

Alternatively or in addition, the service provider 130 may be able to link the information communicated by the MNO A 115A to an existing user ID of the service provider 130. The service provider 130 may then use the historical behavioral data associated with the user ID to provide targeted advertisements for display in the mobile messaging application 1010. The user information from the MNO A 115A may be linked to a user ID through the home address of the user AA 120AA, the mobile phone number of the user AA 120AA, or generally any information that may be linked from the mobile account of the user AA 120AA to the user ID of the user AA 120AA on the service provider 130.

The MNO A 115A may provide an incentive to the user AA 120AA for displaying ads in the mobile messaging application 1010, such as not charging the user AA 120AA for receiving and/or sending mobile messages. If the user AA 120AA selects the advertisement 1020, the mobile web browser of the user AA 120AA may be opened to the mobile site identified by the advertisement 1020. Alternatively or in addition selecting the advertisement may result in the mobile device 220AA dialing the phone number associated with the advertisement 1020, such as the phone number of one of the revenue generators 110A-N. Alternatively or in addition selecting the advertisement may result in entering a survey or a contest of one of the revenue generators 110A-N.

FIG. 11 illustrates a general computer system 1100, which may represent a service provider server 240, a third party server 250, an advertising services server 260, one of the mobile devices 220AA-NN or any of the other computing devices referenced herein. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The computer system 1100 may include a set of instructions 1124 that may be executed to cause the computer system 1100 to perform any one or more of the methods or computer based functions disclosed herein. The computer system 1100 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1100 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 1124 (sequential or otherwise) that specify actions to be taken by that machine. In a particular embodiment, the computer system 1100 may be implemented using electronic devices that provide voice, video or data communication. Further, while a single computer system 1100 may be illustrated, the term "system" shall also be taken to include any collection of systems or subsystems that individually or jointly execute a set, or multiple sets, of instructions to perform one or more computer functions.

As illustrated in FIG. 11, the computer system 1100 may include a processor 1102, such as, a central processing unit (CPU), a graphics processing unit (GPU), or both. The processor 1102 may be a component in a variety of systems. For example, the processor 1102 may be part of a standard personal computer or a workstation. The processor 1102 may be one or more general processors, digital signal processors, application specific integrated circuits, field programmable gate arrays, servers, networks, digital circuits, analog circuits, combinations thereof, or other now known or later developed devices for analyzing and processing data. The processor 1102 may implement a software program, such as code generated manually (i.e., programmed).

The computer system 1100 may include a memory 1104 that can communicate via a bus 1108. The memory 1104 may be a main memory, a static memory, or a dynamic memory. The memory 1104 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 1104 may include a cache or random access memory for the processor 1102. Alternatively or in addition, the memory 1104 may be separate from the processor 1102, such as a cache memory of a processor, the system memory, or other memory. The memory 1104 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 1104 may be operable to store instructions 1124 executable by the processor 1102. The functions, acts or tasks illustrated in the figures or described herein may be performed by the programmed processor 1102 executing the instructions 1124 stored in the memory 1104. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 1100 may further include a display 1114, such as a liquid crystal display (LCD), an organic light emitting diode (OLED), a flat panel display, a solid state display, a cathode ray tube (CRT), a projector, a printer or other now known or later developed display device for outputting determined information. The display 1114 may act as an interface for the user to see the functioning of the processor 1102, or specifically as an interface with the software stored in the memory 1104 or in the drive unit 1106.

Additionally, the computer system 1100 may include an input device 1112 configured to allow a user to interact with any of the components of system 1100. The input device 1112 may be a number pad, a keyboard, or a cursor control device, such as a mouse, or a joystick, touch screen display, remote control or any other device operative to interact with the system 1100.

The computer system 1100 may also include a disk or optical drive unit 1106. The disk drive unit 1106 may include a computer-readable medium 1122 in which one or more sets of instructions 1124, e.g. software, can be embedded. Further, the instructions 1124 may perform one or more of the methods or logic as described herein. The instructions 1124 may reside completely, or at least partially, within the memory 1104 and/or within the processor 1102 during execution by the computer system 1100. The memory 1104 and the processor 1102 also may include computer-readable media as discussed above.

The present disclosure contemplates a computer-readable medium 1122 that includes instructions 1124 or receives and executes instructions 1124 responsive to a propagated signal; so that a device connected to a network 235 may communicate voice, video, audio, images or any other data over the network 235. The instructions 1124 may be implemented with hardware, software and/or firmware, or any combination thereof. Further, the instructions 1124 may be transmitted or received over the network 235 via a communication interface 1118. The communication interface 1118 may be a part of the processor 1102 or may be a separate component. The communication interface 1118 may be created in software or may be a physical connection in hardware. The communication interface 1118 may be configured to connect with a network 235, external media, the display 1114, or any other components in system 1100, or combinations thereof. The connection with the network 235 may be a physical connection, such as a wired Ethernet connection or may be established wirelessly as discussed below. Likewise, the additional connections with other components of the system 1100 may be physical connections or may be established wirelessly. In the case of a service provider server 240, a third party server 250, an advertising services server 260, the servers may communicate with users 120AA-NN and the revenue generators 110A-N through the communication interface 1118.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 1122 may be a single medium, or the computer-readable medium 1122 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 1122 may include a solid-state memory such as a memory card or other package that houses one or more non-volatile read-only memories. The computer-readable medium 1122 also may be a random access memory or other volatile re-writable memory. Additionally, the computer-readable medium 1122 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A method for serving targeted advertisements over mobile messaging services, comprising:

receiving a request for an advertisement from a mobile network operator, wherein the mobile network operator provides mobile services to a first user and a second user, further wherein the request for the advertisement is related to a mobile message sent from the first user to the second user via the mobile network operator;

determining whether the first user comprises an external short messaging entity;

retrieving an advertisement that is associated with the mobile network operator based on the request for the advertisement and information describing the external short messaging entity, when the first user comprises the external short messaging entity and retrieving an advertisement based on the mobile network operator that is associated with the advertisement, wherein the advertisement comprises a Uniform Resource Locator ("URL") which directs a user to an advertiser's website;

verifying that a mobile device of the second user can support technology implemented by the advertiser's website;

communicating the advertisement to the mobile network operator;

directing the second user to the advertiser's website when the second user interacts with the advertisement and the mobile device of the second user can support technology implemented by the advertiser's website; and directing the user to a landing page distinct from the advertiser's website when the second user interacts with the advertisement and the mobile device of the second user cannot support technology implement by the advertiser's website.

2. The method of claim 1 wherein the request for the advertisement comprises the mobile message.

3. The method of claim 2 wherein communicating the advertisement to the mobile network operator further comprises:
   attaching the advertisement to the mobile message; and
   communicating the mobile message, with the attached advertisement, to the mobile network operator.

4. The method of claim 2 wherein the mobile message comprises an alert subscribed to by the second user.

5. The method of claim 4 wherein retrieving an advertisement based on the request for an advertisement further comprises retrieving an advertisement based on a category of the alert subscribed to by the second user.

6. The method of claim 1 wherein the mobile network operator attaches the advertisement to the mobile message and communicates the mobile message with the attached advertisement to the second user.

7. The method of claim 1 wherein the request for an advertisement comprises a message length.

8. The method of claim 7 wherein the retrieved advertisement is limited in length by the message length.

9. The method of claim 1 wherein the first user comprises an external short messaging entity, the method further comprising retrieving the advertisement based on the request for the advertisement and information describing the external short messaging entity.

* * * * *